(12) United States Patent
Masuko et al.

(10) Patent No.: US 12,356,023 B2
(45) Date of Patent: Jul. 8, 2025

(54) SIMULTANEOUS PROVISION OF MULTIPLE HIGHLY RANKED MOVING IMAGES

(71) Applicant: Rakuten Group, Inc., Tokyo (JP)

(72) Inventors: Soh Masuko, Tokyo (JP); Keisuke Takami, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 18/608,955

(22) Filed: Mar. 19, 2024

(65) Prior Publication Data
US 2024/0323455 A1    Sep. 26, 2024

(30) Foreign Application Priority Data
Mar. 20, 2023   (JP) .................. 2023-044051

(51) Int. Cl.
| H04N 21/218 | (2011.01) |
| H04N 21/234 | (2011.01) |
| H04N 21/2343 | (2011.01) |
| H04N 21/2365 | (2011.01) |
| H04N 21/2665 | (2011.01) |

(52) U.S. Cl.
CPC .  *H04N 21/21805* (2013.01); *H04N 21/23418* (2013.01); *H04N 21/2343* (2013.01); *H04N 21/2365* (2013.01); *H04N 21/2665* (2013.01)

(58) Field of Classification Search
CPC ....... H04N 21/21805; H04N 21/23418; H04N 21/2343; H04N 21/2365; H04N 21/2665; H04N 21/2385; H04N 23/661; H04N 21/2402; H04N 21/64738
See application file for complete search history.

(56) References Cited

FOREIGN PATENT DOCUMENTS

JP    2021010115 A    1/2021

*Primary Examiner* — Anthony Bantamoi
(74) *Attorney, Agent, or Firm* — HAUPTMAN HAM, LLP

(57) ABSTRACT

A network management device includes a processor which ranks multiple moving images taken by wireless communication terminals simultaneously capturing one of multiple sections in an event venue to select multiple moving images ranked higher for the section. The processor increases uplink throughput for the multiple wireless communication terminals corresponding to the multiple moving images ranked higher for the selected section. The processor generates an overall video signal including multiple video signals corresponding to the multiple wireless communication terminals for which the uplink throughput is increased. The processor supplies the generated overall video signal to at least one reproduction device in which moving images are reproduced. The overall video signal is in a format that enables the reproduction device to simultaneously reproduce the multiple moving images corresponding to the multiple video signals in the overall video signal.

11 Claims, 17 Drawing Sheets

SIMULTANEOUS PROVISION OF MULTIPLE HIGHLY RANKED MOVING IMAGES

CROSS-REFERENCE TO RELATED PATENT APPLICATION

This application claims the benefit of Japanese Patent Application 2023-044051, filed on Mar. 20, 2023, the entire disclosure of which is incorporated by reference herein.

TECHNICAL FIELD

The present disclosure relates to simultaneous provision of multiple highly ranked moving images.

BACKGROUND ART

When viewing moving images in events such as sports events, it will be convenient if on-demand moving images are simultaneously shown on a viewer's display device. JP-A-2021-010115 discloses provision of a moving image of a game in which multiple competitors participate. In JP-A-2021-010115, when predetermined switching conditions are satisfied, the moving image of a competitor who satisfies the predetermined display conditions is automatically displayed.

SUMMARY OF THE INVENTION

However, automatically selected moving images do not always match the preferences of the viewer.

Accordingly, the present disclosure provides a technique for simultaneously providing multiple moving images, which include those that match the viewer's preferences.

One aspect of the present disclosure provides a network management device. The network management device includes a processor configured to execute a ranking process, a throughput-increasing process, an overall video signal generation process, and an overall video signal supplying process. In the ranking process, the processor ranks multiple moving images taken by cameras of wireless communication terminals simultaneously capturing one of multiple sections in an event venue to select multiple moving images ranked higher for the section. In the throughput-increasing process, the processor increases uplink throughput for the multiple wireless communication terminals corresponding to the multiple moving images ranked higher for the section selected in the ranking process. In the overall video signal generation process, the processor generates an overall video signal including multiple video signals corresponding to the multiple wireless communication terminals for which the uplink throughput is increased in the throughput-increasing process. In the overall video signal supplying process, the processor supplies the overall video signal generated in the overall video signal generation process to at least one reproduction device in which moving images are reproduced. The overall video signal is in a format that enables the reproduction device to simultaneously reproduce the multiple moving images corresponding to the multiple video signals in the overall video signal.

In the aspect of the present disclosure, since an overall moving image that includes multiple higher-ranked moving images is supplied to the reproduction device, multiple moving images that may include moving images that conform to viewer preferences can be provided simultaneously. In particular, since the uplink throughput is increased for the wireless communication terminals that supplying the multiple highly ranked moving images, the frame rate of the multiple moving images in the overall moving image reproduced by the reproduction device can be increased and the moving images can be provided in high definition without discomfort.

DESCRIPTION OF EMBODIMENTS

Hereinafter, with reference to the accompanying drawings, embodiments according to the present disclosure will be described. It is of note that the drawings are not necessarily to scale, and certain features may be exaggerated or omitted.

Figure 1:
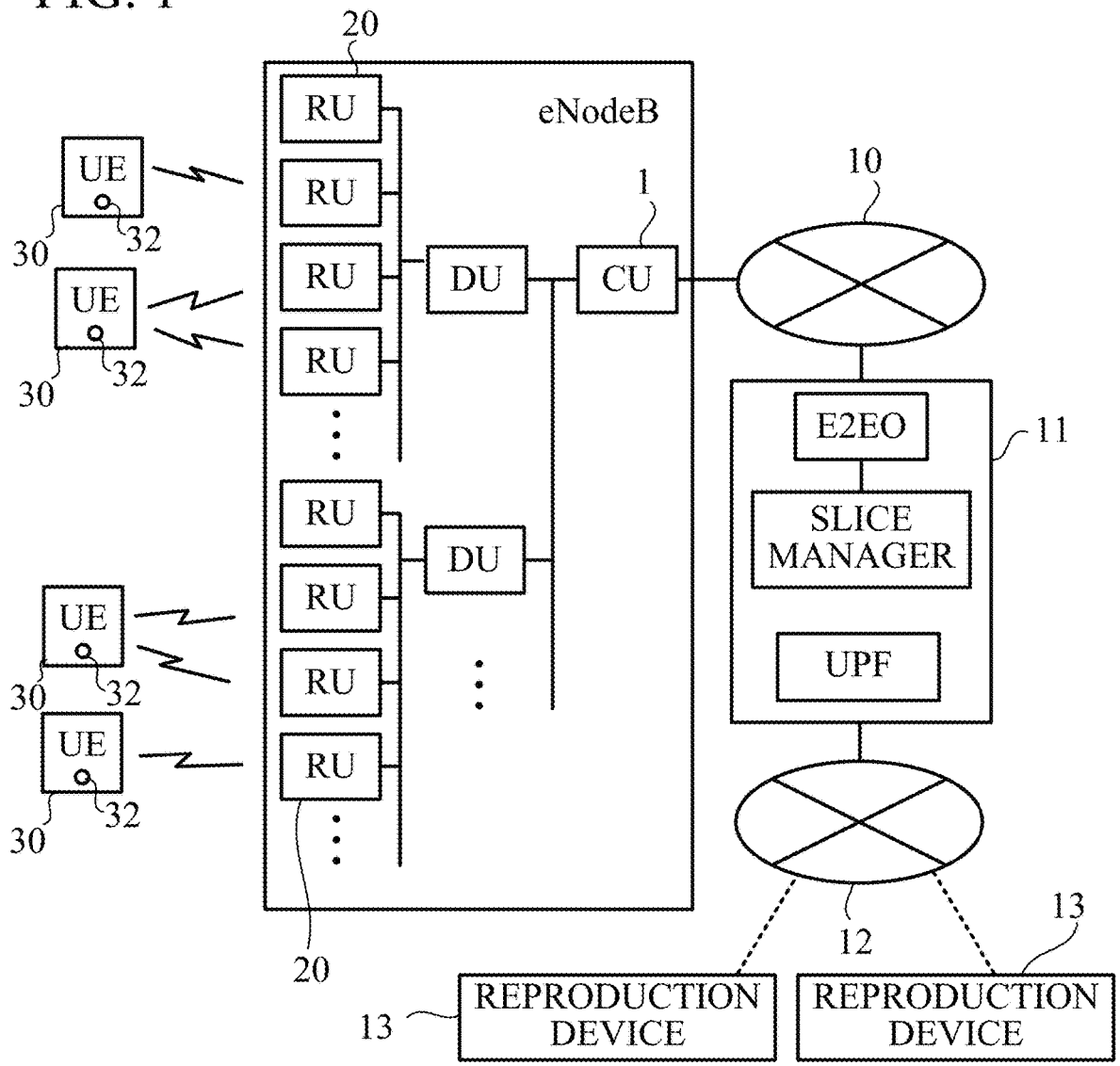
FIG. 1 is a block diagram showing a communication network in accordance with an embodiment of the present disclosure.

As shown in FIG. 1, the communication network according to an embodiment of the present disclosure has an eNodeB (cellular base station), a backhaul transport network 10, and an exchange station 11. For simplicity of description, FIG. 1 shows a single eNodeB, but the communication network has multiple eNodeBs. The communication network is a network for a fifth generation (5G) wireless communication system.

Each eNodeB has a CU (central unit) 1, multiple DUs (distributed units) and multiple RUs (radio units) 20. The DUs are connected to the CU 1.

The CU 1 performs radio resource control, operations according to the PDCP (Packet Data Convergence Protocol), operations according to the SDAP (Service Data Adaptation Protocol, etc. The CU 1 corresponds to the network management device of the present disclosure.

The DUs are responsible for modulation/demodulation, coding/decoding, scrambling, media access control, etc. for user data.

The multiple RUs 20 are connected to a single DU. Each RU 20 is a radio antenna unit having a phased array antenna device. The phased array antenna device has a large number of radio antenna elements. Using the antenna device, each RU 20 can wirelessly communicate with multiple UEs (User Equipments) 30.

Uplink user data from a UE (radio communication terminal) 30 is received by at least one RU 20 and transmitted from the RU 20 to the corresponding DU and the CU 1. The CU 1 transmits the uplink user data to the exchange station 11 via the wired backhaul transport network 10. The exchange station 11 transmits the user data over the Internet 12 to the destination communication device.

When the exchange station 11 receives user data destined for a UE 30, it transmits the user data via the backhaul transport network 10 to the CU 1 of the eNodeB having the coverage in which the UE 30 is located. The DU transmits downlink user data to the RU 20, which in turn transmits the downlink user data to the destination UE 30.

In an embodiment of the present disclosure, each UE 30 may be a smartphone or tablet terminal capable of 5G wireless communication, or a wearable camera capable of 5G wireless communication. In either case, each UE 30 has a camera 32 that captures moving images.

The CU 1 receives the moving images captured by the cameras 32 of the multiple UEs 30 over the uplink via RUs 20 and DUs, ranks the moving images, and generates an overall video signal (i.e., overall moving image signal) including multiple video signals (i.e., multiple moving image signals) corresponding to multiple highly ranked moving images. The CU 1 then supplies the overall video signal to at least one reproduction device 13, at which the moving images are reproduced, connected to the Internet 12 via the exchange station 11 and the transport network 10. The CU 1 provides the reproduction device 13 with the overall video signal in a format by which the reproduction device 13 can simultaneously reproduce the multiple moving images corresponding to the multiple video signals.

The reproduction device 13 may be a wireless communication terminal (e.g., a tablet terminal) that is located in a coverage of another eNodeB, or a computer that can execute wired communication and that is wired to the Internet 12.

Figure 2:
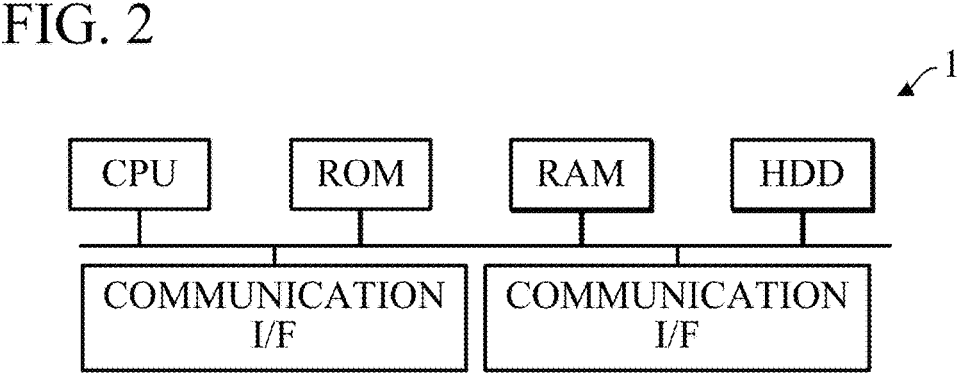
FIG. 2 is a block diagram showing a network management device in accordance with an embodiment of the present disclosure.

As shown in FIG. 2, the CU 1 has a CPU (central processing unit), i.e., a processor, a ROM (read only memory), a RAM (random access memory), an HDD (hard disk drive), and multiple communication interfaces (I/Fs).

The ROM or the HDD stores computer programs needed for operations of the CU 1. The ROM or the HDD also stores parameters and other data needed for operations of the CU 1.

The CPU executes the computer programs stored in the ROM or HDD and operates according to the computer programs while using the data stored in the ROM or HDD. Specifically, the CPU transfers the above-mentioned user data and operates according to the PDCP and the SDAP for the data transfer. The CPU also controls radio resource control, i.e., settings for the communication between each UE 30 and each RU 20 within the coverage of the CU 1. For example, as described below, the CPU controls the beamforming settings for each RU 20. Furthermore, the CPU receives moving images captured by the cameras 32 of the multiple UEs 30 over the uplink, ranks the moving images, generates an overall video signal, and supplies the overall video signal to the reproduction device 13.

The RAM is used as a work area for the CPU.

The multiple communication interfaces are connected to the DU and the backhaul transport network 10, respectively.

Figure 3:
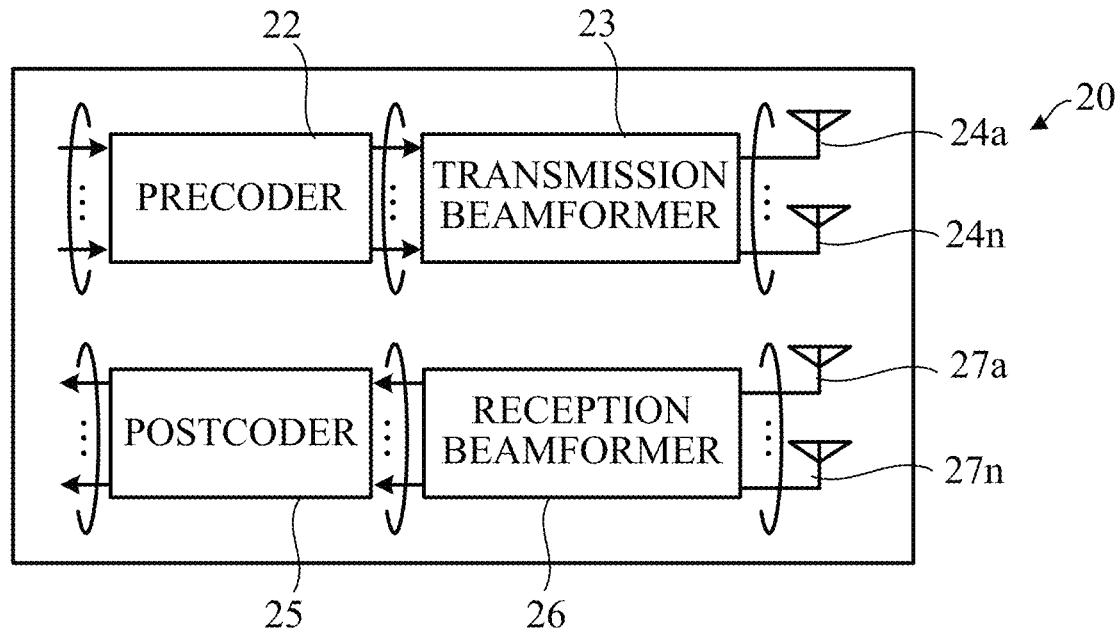
FIG. 3 is a schematic block diagram showing a radio antenna unit in accordance with an embodiment of the present disclosure.

FIG. 3 is a schematic block diagram of the RU 20 that is a radio antenna unit. As shown in FIG. 3, the RU 20 has a precoder 22, a transmission beamformer 23, a large number of transmission antenna elements 24a to 24n, a postcoder 25, a reception beamformer 26, and a large number of reception antenna elements 27a to 27n.

Although not shown in FIG. 3, the RU 20 has a CPU, namely a processor for executing communication, a ROM, a RAM, an HDD, and a communication interface The ROM or HDD stores computer programs needed for operations of the RU 20. The CPU executes the computer programs stored in the ROM or HDD and operates according to the computer programs while using data stored in the ROM or HDD. The CPU operates the UE 30. Specifically, the CPU controls wireless communication of user data with the UEs 30 and wired communication of user data with the corresponding DU. The RAM is used as a work area for the CPU. The communication interface is connected to the DU.

The transmission antenna elements 24a to 24n constitute a phased array antenna device. Downlink signals destined for multiple UEs 30 from the RU 20 are input to precoder 22. In other words, the number of signals input to precoder 22 is the number of downlink streams (also called layers or ranks) transmitted from RU 20. The precoder 22 performs a precoding scheme necessary for downlink transmission beamforming. The precoding scheme reduces interference between UEs 30 and between downlink streams. The precoder 22 may be a digital precoder, an analog precoder, or a hybrid of both.

The output of the precoder 22 is fed to the transmission beamformer 23. The transmission beamformer 23 adjusts the phase and amplitude of signals to be fed to the transmission antenna elements 24a to 24n. The transmission beamformer 23 may be a digital beamformer, an analog beamformer, or a hybrid of both. The number of signals output from the transmission beamformer 23 is the number of transmission antenna elements 24a to 24n.

The reception antenna elements 27a to 27n constitute a phased array antenna device. Uplink signals from the reception antenna elements 27a to 27n are supplied to the reception beamformer 26. The number of signals supplied to the reception beamformer 26 is the number of reception antenna elements 27a to 27n. The reception beamformer 26 adjusts the phase and amplitude of the signals supplied from the reception antenna elements 27a to 27n. The reception beamformer 26 may be a digital beamformer, an analog beamformer, or a hybrid of both.

The output of the reception beamformer 26 is fed to the postcoder 25. The postcoder 25 performs a postcoding scheme necessary for uplink reception beamforming and separates uplink signals received from the multiple UEs 30 located in the cell of the RU 20. In other words, the number of signals output from the postcoder 25 is the number of uplink streams transmitted from UEs 30 to the RU 20. The postcoding scheme reduces interference between UEs 30 and between uplink streams. The postcoder 25 may be a digital postcoder, an analog postcoder, or a hybrid of both.

Millimeter carrier waves are used in 5G wireless communication systems to ensure high transmission throughput. Since the reach of millimeter carrier waves is short, the Massive-MIMO transmission scheme, which utilizes a large number of antenna elements capable of beamforming, is employed to extend the reach of the carrier waves.

Figure 4:
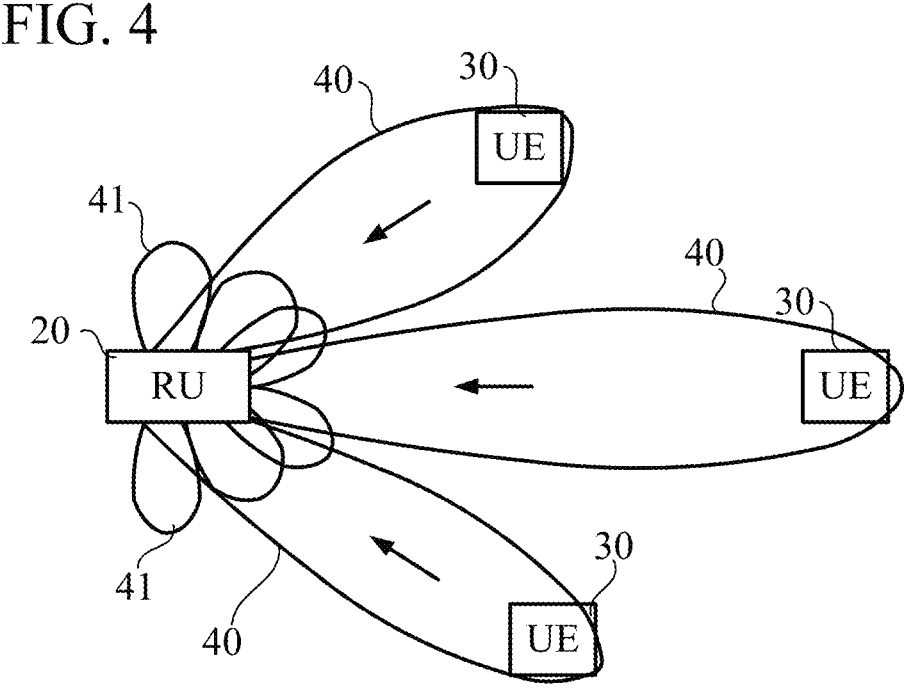
FIG. 4 is a conceptual diagram of uplink reception beamforming in accordance with an embodiment of the present disclosure.

FIG. 4 illustrates the concept of uplink reception beamforming. For executing uplink reception beamforming, the RU 20 transmits (sweeps) downlink beams to be measured in multiple directions periodically or upon request from one or more UEs 30. Each UE 30 measures the reception power or the reception quality of the signal, e.g., CSI-RS (channel state information reference signal) contained in the beams to be measured, and reports the measurement results. Based on the measurement result reports (channel state information reports), the reception beamformer 26 of the RU 20 forms the uplink reception beams so that each main lobe 40 is directed to the corresponding UE 30. More precisely, the reception beamformer 26 adjusts the phase and amplitude of the signals supplied from the reception antenna elements 27a to 27n so that the reception quality of the carrier wave from each UE 30 at the RU 20 is maximized in the direction from the UE 30 to the RU 20. Assuming that the multiple reception antenna elements 27a to 27n are transmission antenna elements, each main lobe 40 corresponds to the shape of the beam formed by the cooperative action of the transmission antenna elements as a result of beamforming. Side lobes 41 are also formed as a result of beamforming. Uplink user data from each UE 30, i.e., data in the PUSCH (physical uplink shared channel is carried in the uplink beam from the UE 30.

The RU 20 performs uplink reception beamforming for each UE 30 individually. However, an uplink beam from each UE 30 is interfered with by uplink beams from other UEs 30 neighboring the UE 30, so that uplink reception beamforming may reduce the reception quality of the user data from the UEs 30 at the RU 20. In other words, a beam from a UE 30 is harmful to another beam from another UE 30 in the same direction. The postcoder 25 performs postcoding to reduce the interference.

As uplink postcoding scheme, for example, the ZF (zero-forcing) scheme and the MMSE (minimum mean square error) scheme are known, which are linear separation schemes, and the MLD (maximum likelihood detection) is known, which is a nonlinear separation scheme.

In ZF postcoding, postcoding weights are set to minimize mutual interference of beams from the UEs 30 at the RU 20 (receiver). In MMSE postcoding, postcoding weights are set taking into account effects of both interference components at the RU 20 (receiver) and thermal noise components at the RU 20. In MLD postcoding, signal separation is executed on the basis of a maximum likelihood decision.

In comparison with ZF postcoding and MMSE postcoding, MLD postcoding can improve the reception quality at the RU 20 (receiver), e.g., the SNR and/or the SINR of the PUSCH. In other words, MLD postcoding is a scheme to improve the reception quality at the RU 20 (receiver) in uplink beamforming.

In the embodiment, each RU 20 can perform two postcoding schemes: one is MLD postcoding that results in higher reception quality at the RU 20 in uplink beamforming, and the other is ZF postcoding or MMSE postcoding that results in lower reception quality at the RU 20 in uplink beamforming. To perform the two postcoding schemes, each RU 20 may have two postcoders 25.

Hereafter, for a UE 30, switching the postcoding scheme so as to improve the reception quality of the transmitted beam from the UE 30 at the RU 20 (i.e., switching the postcoding scheme from ZF or MMSE to MLD) is referred to as a first postcoding adjustment process. Conversely, switching the postcoding scheme for a UE 30 so as to decrease the reception quality of the transmitted beam from the UE 30 at the RU 20 (i.e., switching the postcoding scheme from MLD to ZF or MMSE) is referred to as a second postcoding adjustment process.

Figure 5:
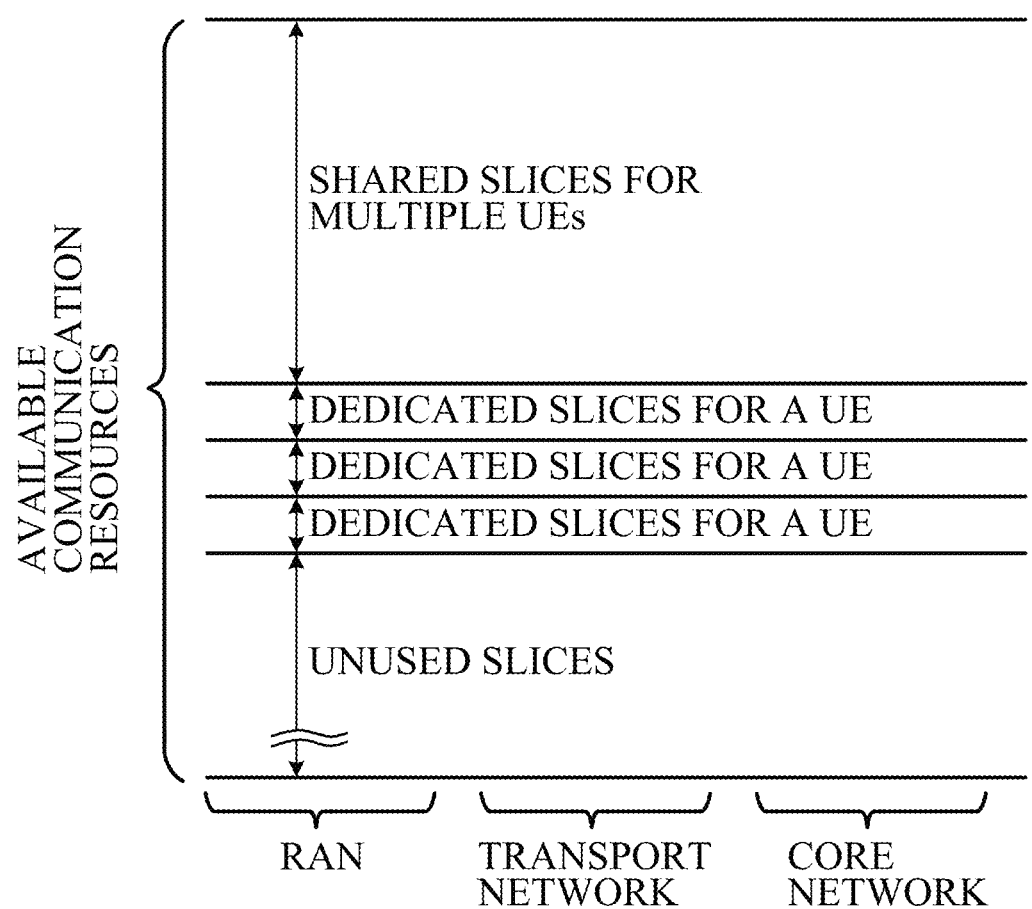
FIG. 5 is a conceptual diagram of slicing according to an embodiment of the present disclosure.

FIG. 5 illustrates the concept of slicing according to the embodiment. The available communication resources in FIG. 5 involve an RAN (radio access network), the backhaul transport network 10 (see FIG. 1), and the core network. The RAN is the wired fronthaul network in the eNodeB and the core network is the wired network in the exchange station 11.

In the embodiment, the available communication resources are classified into shared slices that are available for multiple UEs and communication resources that are available for individual UEs. FIG. 5 shows that part of the communication resources available for individual UEs are currently used as dedicated slices for three UEs. The remaining available communication resources are unused slices. The communication resources to be sliced in the present disclosure are mainly wired resources, but are not limited to wired resources and may also be wireless resources.

As shown in FIG. 1, the exchange station 11 has an E2EO (end to end orchestrator), a slice manager, and a UPF (User Plane Function). In the embodiment, the E2EO manages slices. Specifically, in accordance with a request from the CU 1, the E2EO gives a command to the slice manager to assign or de-assign a dedicated slice for a particular UE 30. The slice manager assigns and de-assigns dedicated slices according to the command. Once the assignment of the dedicated slice by the slice manager is completed, the CU 1 and the UPF use the communication resources dedicated to the corresponding UE 30 according to the assignment of the dedicated slice. Once the de-assignment of the dedicated slice by the slice manager is completed, the CU 1 and the UPF control the corresponding UE 30 to use the shared slices according to the de-assignment.

Figure 6:
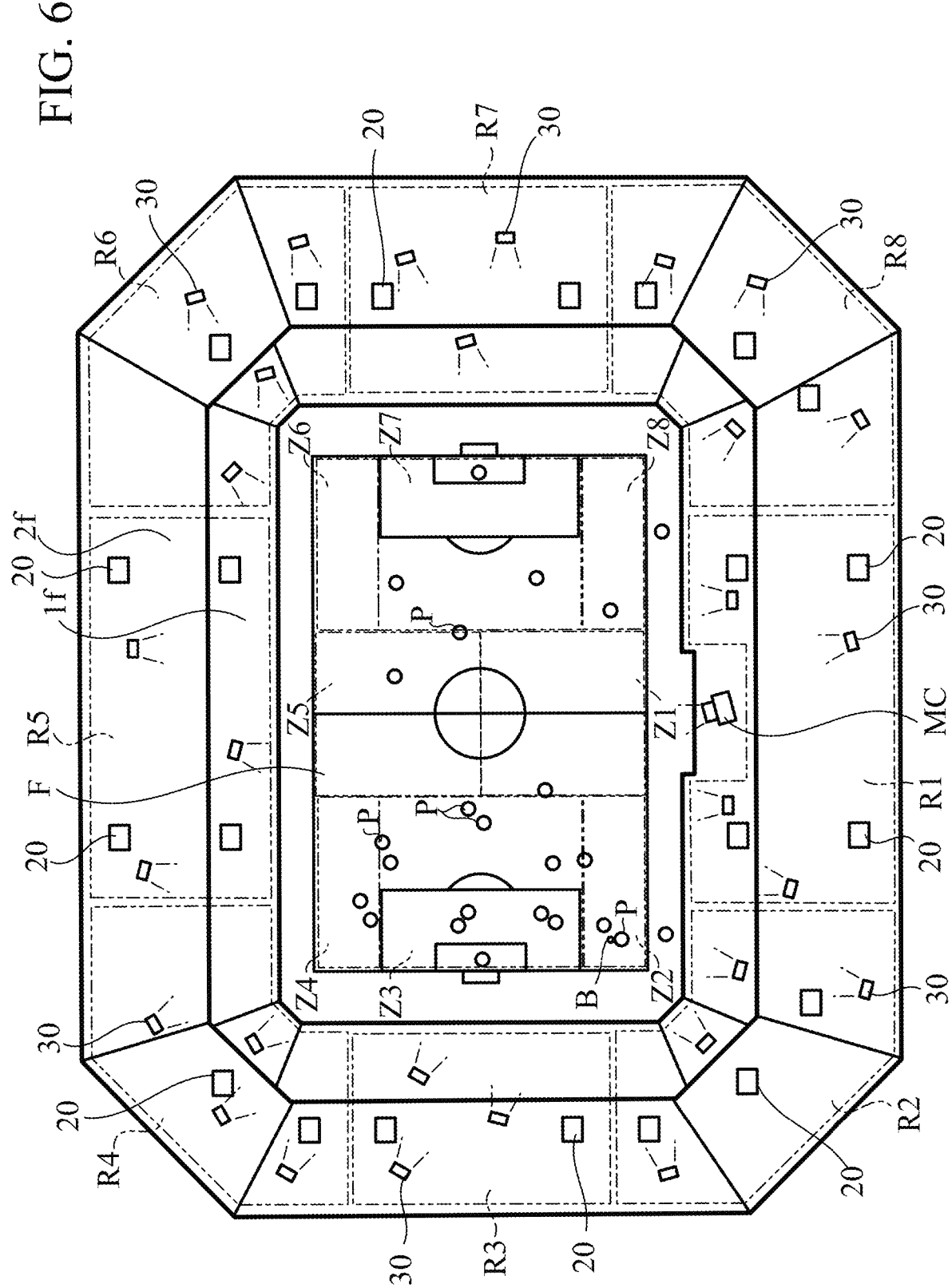
FIG. 6 is a plan view of a soccer stadium to which an embodiment of the present disclosure is applied.

FIG. 6 is a plan view of a stadium to which the embodiment of the present disclosure is applied. The stadium shown in the FIG. 6 is a soccer stadium (event venue) where soccer games (events) are played.

The soccer stadium has a pitch or field F, first-floor seats (ground-floor seats) 1F around the field F, and second-floor seats (balcony seats) 2F around the first-floor seats 1F. While a soccer game is being played, there are multiple humans P on the field F. The humans P include players, the referee, the assistant referees (linesmen), and the fourth official. The players compete for the ball B during the game.

In the spectator seating area of the soccer stadium (first-floor seats 1F and second-floor seats 2F), a large number of RUs 20 connected to a single DU are arranged and spaced apart from each other. Information on the location of each of the RUs 20 is stored in, for example, the HDD in the CU 1.

In addition, a large number of UEs 30 are located in the spectator seating area. Each of the UEs 30 is carried by a person in the audience. Currently, many of the UEs 30 have cameras 32. Some spectators in the soccer stadium point the cameras 32 of the UEs 30 at the field F to capture moving images of the game. In FIG. 6, two lines extending from each UE 30 represent the field of view of the camera 32 used for shooting moving images. As noted above, each UE 30 may be a smartphone or tablet terminal capable of 5G wireless communication, or a wearable camera capable of 5G wireless communication.

Some spectators who are capturing moving images of the game with the cameras 32 of the UEs 30 may continuously upload their moving images to the CU 1 via the RUs 20. As described below, the CU 1 ranks the moving images of the game being captured simultaneously by multiple cameras 32 of UEs 30, and provides an overall video signal including multiple video signals corresponding to highly ranked moving images to at least one reproduction device 13 (see FIG. 1).

In the embodiment of the present disclosure, the spectator seating area is divided into multiple (eight in the embodiment) regions R1 to R8. Regions R1 and R5 are side areas, regions R3 and R7 are end areas, and regions R2, R4, R6, and R8 are corner areas. Region R1 is closest to central section Z1 in the field F and is best suited for observing section Z1. In other words, the moving image captured by a camera 32 of a UE 30 in region R1 is optimal for observing section Z1. Region R2 is closest to corner section Z2 in the field F and is best suited for observing section Z2. Region R3 is closest to section Z3 behind the goal in the field F and is best suited for observing section Z3. Region R4 is closest to corner section Z4 in the field F and is best suited for observing section Z4. Region R5 is closest to central section Z5 in the field F and is best suited for observing section Z5. Region R6 is closest to corner section Z6 in the field F and is best suited for observing section Z6. Region R7 is closest to section Z7 behind the goal in the field F and is best suited for observing section Z7. Region R8 is closest to corner section Z8 in the field F and is best suited for observing section Z8. However, it is possible to view the entire field F in any of the regions.

Sections Z1 to Z8 are used in a continuous section observation mode that will be described below. Sections Z1 to Z8 do not overlap each other. Section Z1 abuts sections Z2, Z3, Z5, Z7, and Z8, and section Z2 abuts sections Z1 and Z3. Section Z3 abuts sections Z1, Z2, Z4, and Z5, and section Z4 abuts sections Z3 and Z5. Section Z5 abuts sections Z1, Z3, Z4, Z6, and Z7, and section Z6 abuts sections Z5 and Z7. Section Z7 abuts sections Z1, Z5, Z6, and Z8, and section Z8 abuts sections Z1 and Z7.

Each region includes first-floor seats 1F and second-floor seats 2F, and at least one RU 20 is located in each region. Information on the location of each RU 20 is stored in, for example, the HDD of the CU 1. The location of each UE 30 in the spectator seating area is also known to the CU 1. For example, the MAC address and/or IMSI (international mobile subscriber identity) of each UE 30 is known by RUs 20 that execute beamforming, so that each UE 30 can inform the CU 1 of the RU 20 with which the UE 30 is communicating. In other words, the CU 1 knows which of regions R1 to R8 is being visited by each UE 30. Furthermore, if UEs 30 in the spectator seating area of the stadium can receive signals from the GPS (Global Positioning System), GPS positioning can be used to locate UEs 30 themselves and the UEs 30 may report the specific locations of the UEs 30 to the CU 1 through the RUs 20. Alternatively, the owners of the UEs 30 may report the ticket numbers of the seats in the spectator seating area to the CU 1.

In the center of the side area, which does not belong to the spectator seating area, there is a main camera MC that captures moving images. The position of the main camera MC is, for example, in front of region R1. The main camera MC is used, for example, by a professional camera operator to track interesting objects in the game (mainly the ball B and its surroundings). The main camera MC is wired or wirelessly connected to the CU 1 so that the video signal of the moving image captured by the main camera MC is fed to the CU 1. In a case in which the main camera MC is connected wirelessly to the CU 1, the main camera MC is one of UEs and the video signal of the moving image captured by the main camera MC is supplied to the CU 1 via an RU 20 and the DU. The moving image captured by the main camera MC is always taken from the side of the field F.

When a 5G-compliant UE 30 enters the spectator seating area, it uses one or more of the RUs 20 to perform 5G wireless communication. Therefore, once the UE 30 enters the spectator seating area, an RU 20 in the vicinity of the UE 30 immediately starts downlink transmission beamforming and uplink reception beamforming. In the soccer stadium, ZF postcoding or MMSE postcoding, which results in low reception quality at the RU 20, is usually used in uplink reception beamforming.

As described above, the CU 1 receives moving images captured by the cameras 32 of multiple UEs 30 in the soccer stadium over the uplink via the RUs 20 and the DU, ranks the moving images, and generates an overall video signal including multiple video signals corresponding to highly ranked moving images. The CU 1 then supplies the overall video signal to at least one reproduction device 13 (see FIG. 1), which is connected to the Internet 12 and in which the moving images are reproduced. The reproduction device 13 may be located inside the soccer stadium, but it will be located outside the soccer stadium in many cases.

Figure 7:
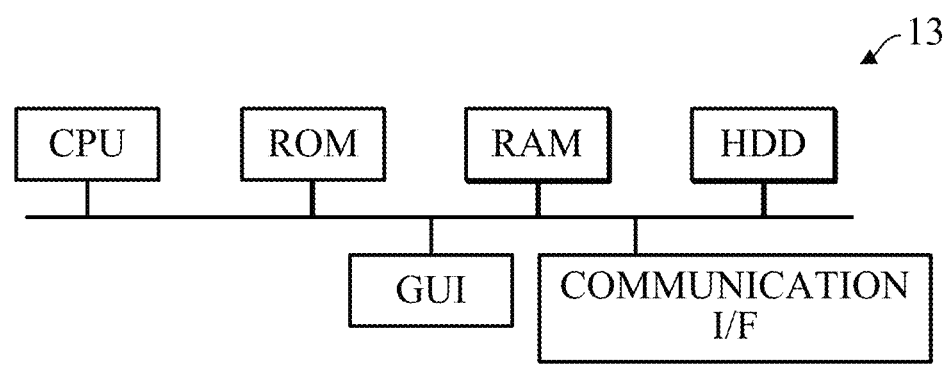
FIG. 7 is a block diagram showing a reproduction device that receives an overall video signal in an embodiment of the present disclosure.

As shown in FIG. 7, the reproduction device 13 has a CPU, namely a processor, a ROM, a RAM, an HDD, communication interface (I/F), and a graphical user interface (GUI).

The ROM or HDD stores computer programs needed for operations of the reproduction device 13. The ROM or HDD also stores parameters and other data needed for operations of the reproduction device 13.

The CPU executes the computer programs stored in the ROM or HDD and operates according to the computer programs while using the data stored in the ROM or HDD.

Figure 19:
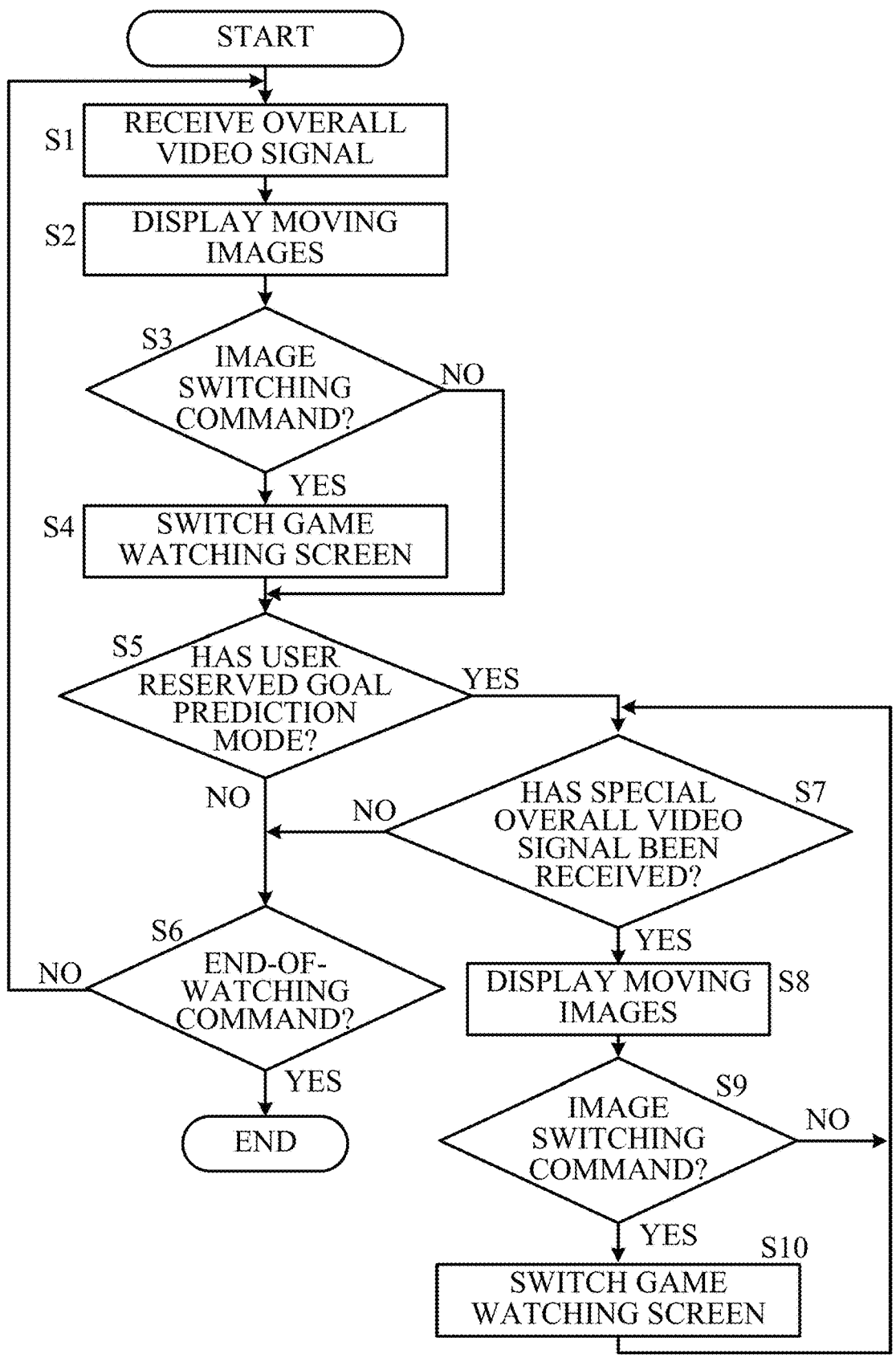
FIG. 19 is a flowchart showing an operation of the reproduction device.

Specifically, the CPU executes an operation shown in FIG. 19 according to one of the computer programs.

The RAM is used as a work area for the CPU.

The communication interface is wirelessly connected or wired to the Internet 12.

The GUI may be a combination of a display device and a pointing device (e.g., a mouse or a touchpad), or a touch panel that functions as both a display device and a pointing device.

Figure 8:
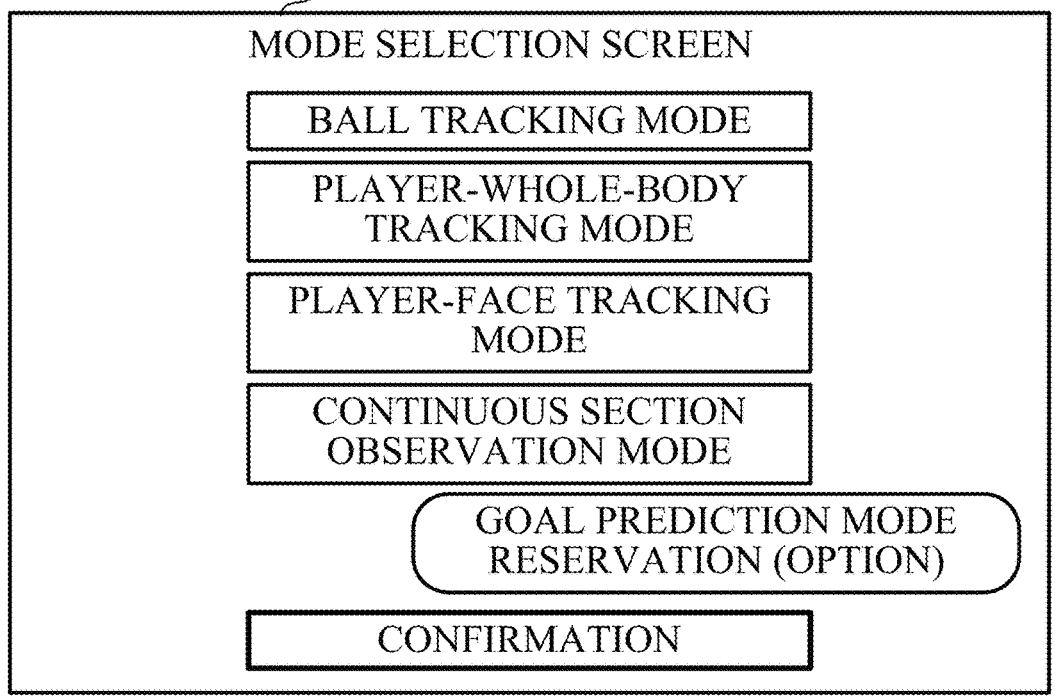
FIG. 8 shows a mode selection screen displayed on a display device of the reproduction device.

FIG. 8 shows a mode selection screen SS displayed on the display device of the reproduction device 13. The mode selection screen SS is presented to the display device before the user of the reproduction device 13 views the moving images supplied from the CU 1 to the reproduction device 13. The mode selection screen SS displays buttons for "ball tracking mode", "player-whole-body tracking mode", "player-face tracking mode", and "continuous section observation mode" as candidate modes among which the user can select. In the ball tracking mode, multiple moving images of the ball, which is used in the game in the soccer stadium, are displayed on the display device. In the ball tracking mode, the ball is continuously tracked as an object. In the player-whole-body tracking mode, multiple moving images of the whole body of one player, who is participating in the game in the soccer stadium, are displayed on the display device. In the player-whole-body tracking mode, the whole body of a player is continuously tracked as an object. In the player-face tracking mode, multiple moving images of the face of one player, who is participating in the game in the soccer stadium, are displayed on the display device. In the player-face tracking mode, the face of a player is continuously tracked as an object. In the continuous section observation mode, multiple moving images of one of sections Z1 to Z8 in the field F are displayed on the display device. In the continuous section observation mode, one of sections Z1 to Z8 is continuously captured as an object.

The mode selection screen SS further displays a button for "Goal Prediction Mode Reservation" as an option for the user of the reproduction device 13. In the goal prediction mode, when a goal, which is a special occurrence, is predicted, multiple moving images that track players who are likely to be associated with the score are displayed on the display device. In a case in which the goal prediction mode is reserved, even if the user has selected any of the ball tracking mode, the player-whole-body tracking mode, the player-face tracking mode, and the continuous section observation mode, when a goal is predicted, the mode selected by the player is interrupted and the goal prediction mode is executed. In other words, the goal prediction mode is executed as an interrupt process.

The user of the reproduction device 13 clicks or touches with a pointing device (e.g., a mouse, a touch pad, or touch panel) the button indicating a preferred mode among the ball tracking mode, the player-whole-body tracking mode, the player-face tracking mode, and the continuous section observation mode to select the preferred mode. To select the goal prediction mode, the user clicks the button indicating the goal prediction mode reservation. After the user finishes selecting the mode, the user clicks or touches the "Confirmation" button on the mode selection screen SS. This will reflect the mode decided by the user on the program of the reproduction device 13.

Figure 9:
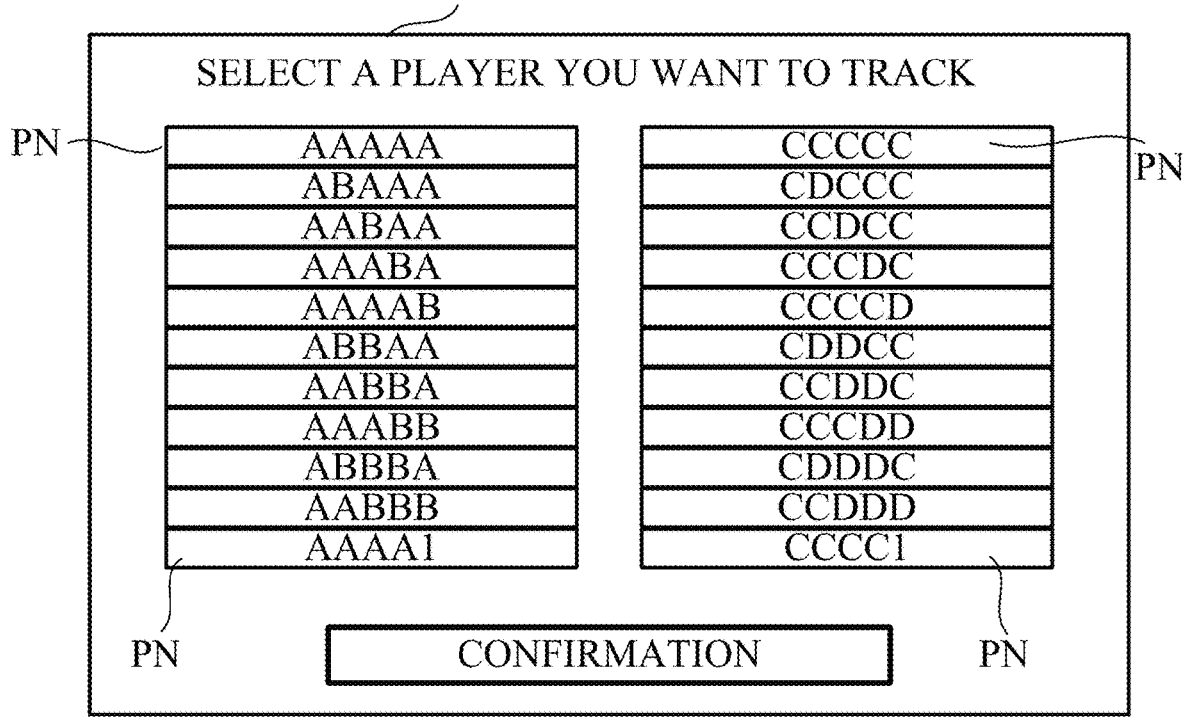
FIG. 9 shows a player selection screen displayed on the display device of the reproduction device.

FIG. 9 shows a player selection screen PS displayed on the display device of the reproduction device 13. The player selection screen PS is displayed in a case in which the user of the reproduction device 13 selects the player-whole-body tracking mode and the player-face tracking mode, which are examples of specific person tracking modes that track a specific person as an object. The player selection screen PS displays a guidance for prompting the user to select a player and buttons PN for selecting one of names of all players participating in the game. The user of the reproduction device 13 clicks or touches a button PN indicating the player of his/her choice with the pointing device (to select a person). After the user finishes selecting a player, the user clicks or touches the "Confirmation" button on the player selection screen PS. This will reflect the player decided by the user on the program of the reproduction device 13.

Figure 10:
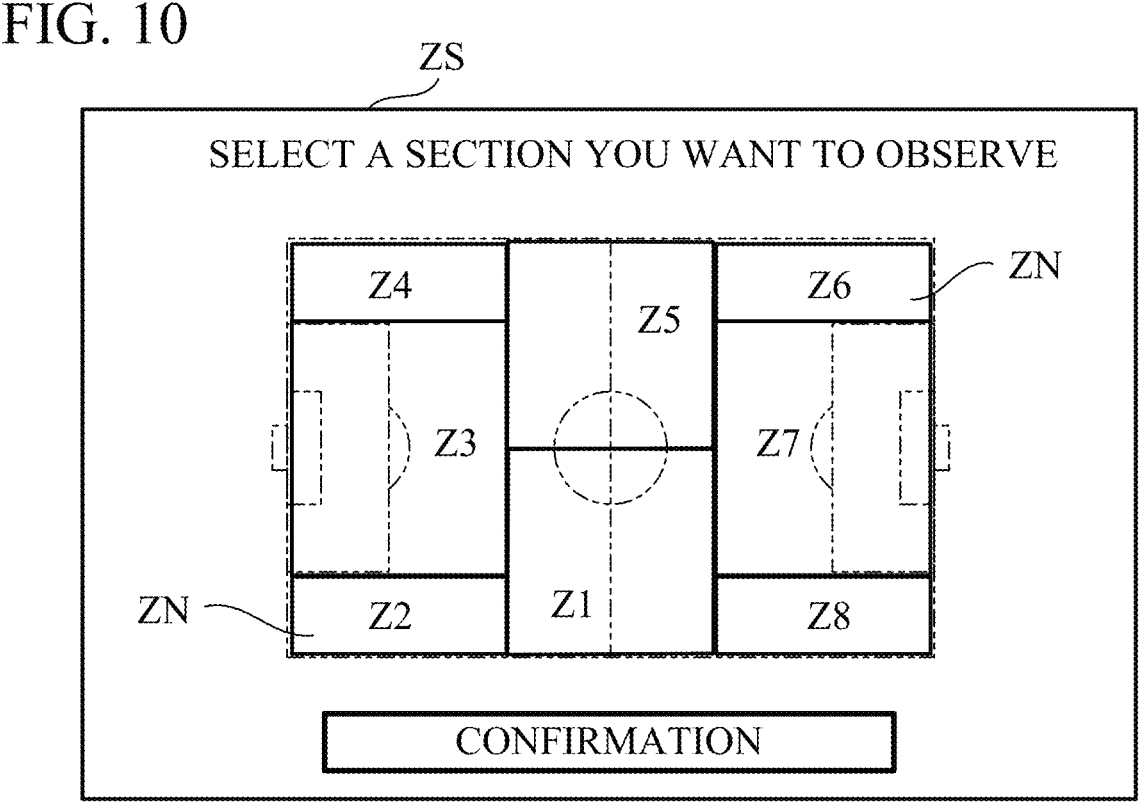
FIG. 10 shows a section selection screen displayed on the display device of the reproduction device.

FIG. 10 shows a section selection screen ZS displayed on the display device of the reproduction device 13. The section selection screen ZS is displayed in a case in which the user of the reproduction device 13 selects the continuous section observation mode that tracks a certain section as an object. The section selection screen ZS displays a guidance for prompting the user to select a section and buttons ZN for selecting one of sections Z1 to Z8. The buttons ZN for sections Z1 to Z8 are superimposed on the image of the field. The user of the reproduction device 13 clicks or touches the button ZN indicating the section of his/her choice with the pointing device to select a section. After the user finishes selecting a section, the user clicks or touches the "Confirmation" button on the section selection screen ZS. This will reflect the section decided by the user on the program of the reproduction device 13.

Figure 11:
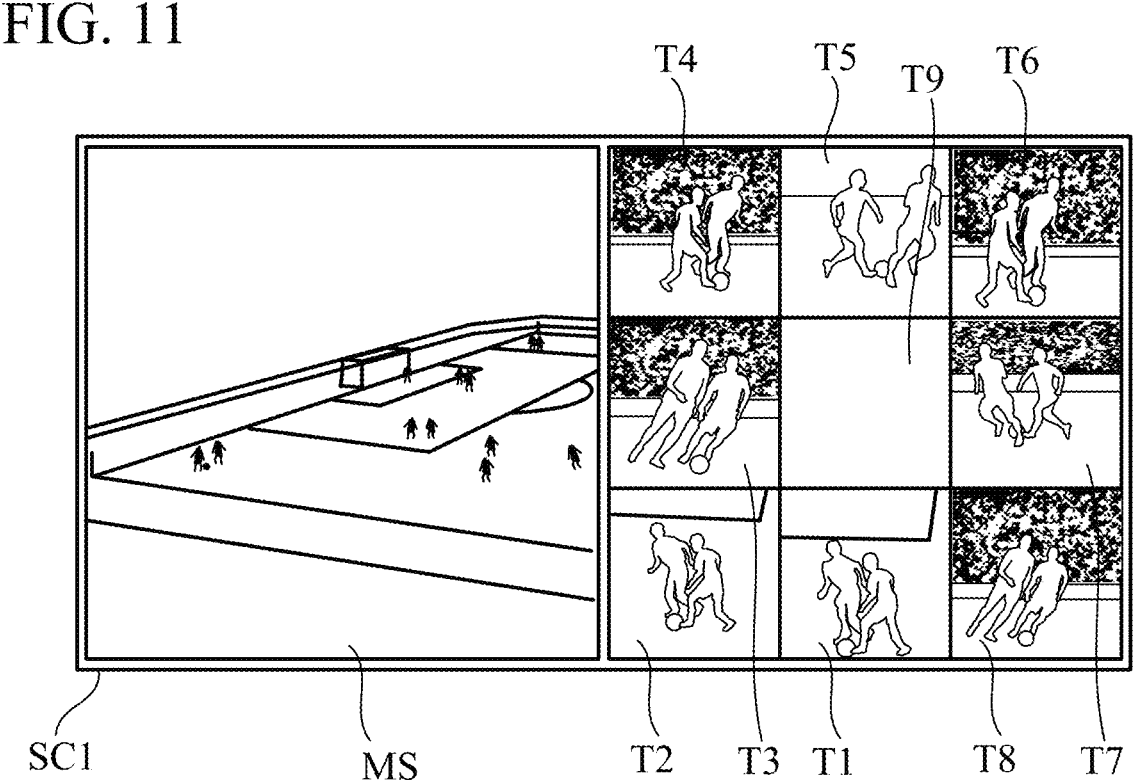
FIG. 11 shows a game watching screen displayed on the display device of the reproduction device in a ball tracking mode.

FIG. 11 shows an initial screen of a game watching screen SC1 displayed on the display device of the reproduction device 13 in the ball tracking mode. As similar to other game watching screens described below, the game watching screen SC1 has a main display portion MS and multiple (nine in the embodiment) thumbnail display portions T1 to T9.

As similar to the other game watching screens described below, the main display portion MS occupies the left half of the game watching screen SC1, and the thumbnail display portions T1 to T9 are obtained by dividing the right half of the game watching screen SC1 into nine equal parts. The moving image displayed in the main display portion MS can be referred to as a main moving image and the moving images displayed in the thumbnail display portions T1 through T9 can be referred to as thumbnail moving images. The main moving image and all thumbnail moving images can be referred to as an overall moving image.

In the initial screen of the ball tracking mode, the moving image captured by the main camera MC (see FIG. 6) is displayed in the main display portion MS, and moving images captured by cameras 32 of UEs 30 of spectators in the stadium are displayed in the thumbnail display portions T1 to T8. Nothing is displayed in the central thumbnail display portion T9. In this mode, the moving images in the thumbnail display portions T1 to T8 are moving images ranked higher (number 1 to 8 in the embodiment) among multiple moving images of the soccer ball taken by UEs 30 of spectators, regardless of regions R1 to R8 or sections Z1 to Z8 in the stadium. Thus, in the initial screen of the ball tracking mode, the user of the reproduction device 13 can watch the larger moving image taken at one point in the stadium by the main camera MC on the main display portion MS, and can watch individual smaller moving images tracking the ball taken from multiple directions on the thumbnail display portions T1 to T8.

The user of the reproduction device 13 can use the pointing device to select a moving image that the user wants to focus on. For example, if the user likes the moving image displayed in the thumbnail display portion T2, the user clicks or touches the thumbnail display portion T2 with the pointing device. When the user clicks or touches his/her preferred thumbnail display portion with the pointing device, the GUI provides the CPU with an image switching command.

Figure 12:
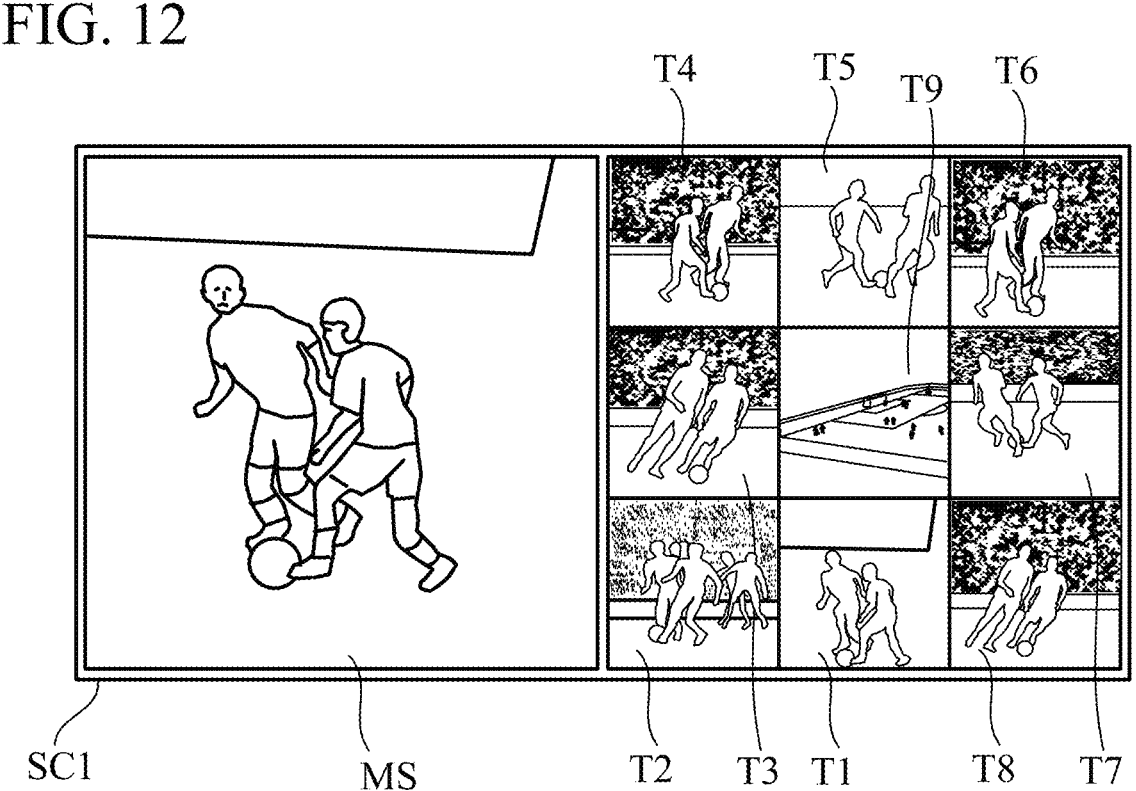
FIG. 12 shows another game watching screen displayed on the display device of the reproduction device in the ball tracking mode.

Then, as shown in FIG. 12, the moving image that was displayed in the thumbnail display portion T2 is enlarged and displayed in the main display portion MS. On the other hand, the moving image taken by the main camera MC that was displayed in the main display portion MS is reduced in size and displayed in the thumbnail display portion T9, which was blank. The images are switched in this way. In the thumbnail display portion T2, a blank may be displayed, or the moving image ranked next (number 9 in the embodiment) in the ball tracking mode may be displayed. Thus, the user can watch the moving image of most interest taken by one UE 30 in an enlarged format on the main display portion MS, and can watch the moving images taken by the main camera MC and other eight UEs 30 on the thumbnail display portions T1 to T9.

Thereafter, the user may continue in this state, or if his/her interest shifts to another moving image displayed in any of the thumbnail display portions T1 to T9 in the game watching screen SC1, the user may select another moving image with the pointing device by clicking or touching any of the thumbnail display portions T1 to T9. The selected moving image is enlarged and displayed on the main display portion MS. If the user clicks or touches the central thumbnail display portion T9, the moving image captured by the main camera MC is enlarged and displayed on the main display portion MS in the same way as in the initial screen. In this way, the user can switch the main moving image to that he/she wants to focus on in the main display portion MS while watching the multiple moving images.

Figure 13:
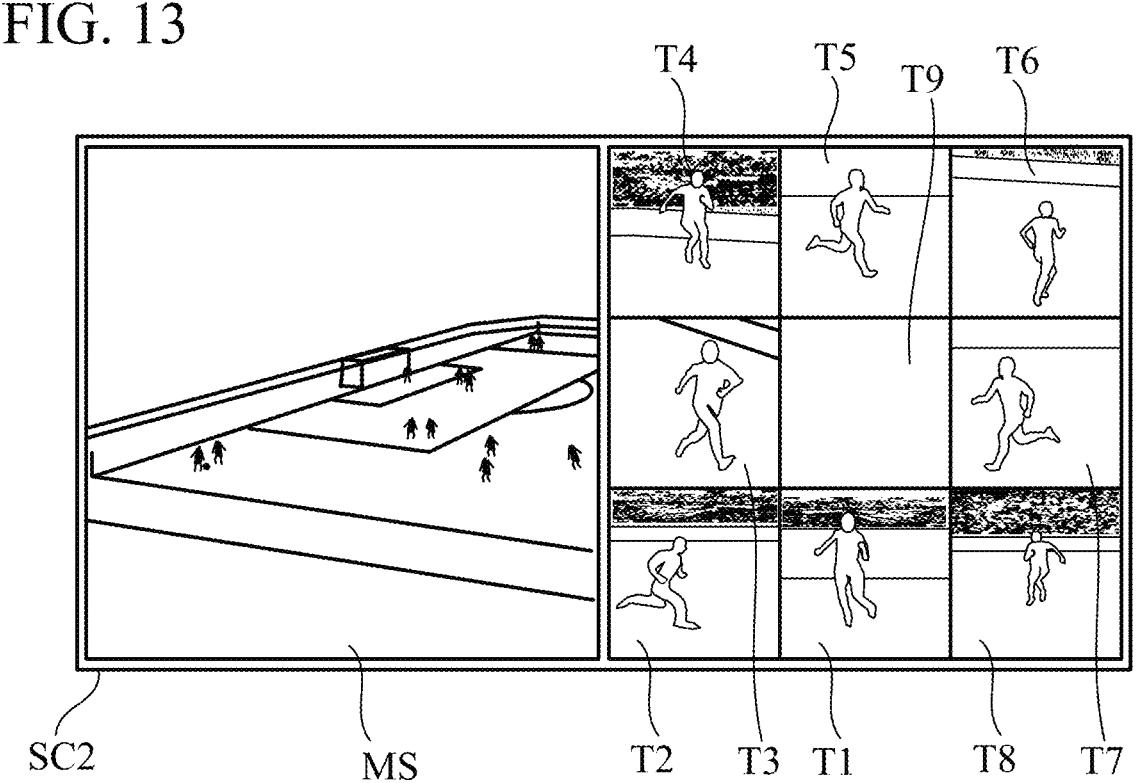
FIG. 13 shows a game watching screen displayed on the display device of the reproduction device in a player-whole-body tracking mode.

FIG. 13 shows an initial screen of a game watching screen SC2 that is displayed on the display device of the reproduction device 13 in the player-whole-body tracking mode.

In the initial screen of the player-whole-body tracking mode, the moving image captured by the main camera MC (see FIG. 6) is also displayed in the main display portion MS, and moving images captured by cameras 32 of UEs 30 of spectators in the stadium are displayed in the thumbnail display portions T1 to T8. Nothing is displayed in the central thumbnail display portion T9. In this mode, the moving images in the thumbnail display portions T1 to T8 are moving images ranked higher (number 1 to 8 in the embodiment) among multiple moving images, taken by spectators' UEs 30, of the whole body of a player selected by the user of the reproduction device 13, regardless of regions R1 to R8 or section Z1 to Z8 in the stadium. Thus, in the initial screen of the player-whole-body tracking mode, the user of the reproduction device 13 can watch the larger moving image taken at one point in the stadium by the main camera MC on the main display portion MS, and can watch individual smaller moving images tracking the player's full body taken from multiple directions on the thumbnail display portions T1 to T8.

The user of the reproduction device 13 can select with the pointing device a moving image that the user wants to focus on. For example, if the user likes the moving image displayed in the thumbnail display portion T4, the user clicks or touches the thumbnail display portion T4 with the pointing device. When the user clicks or touches his/her preferred thumbnail display portion with the pointing device, the GUI provides the CPU with an image switching command.

Figure 14:
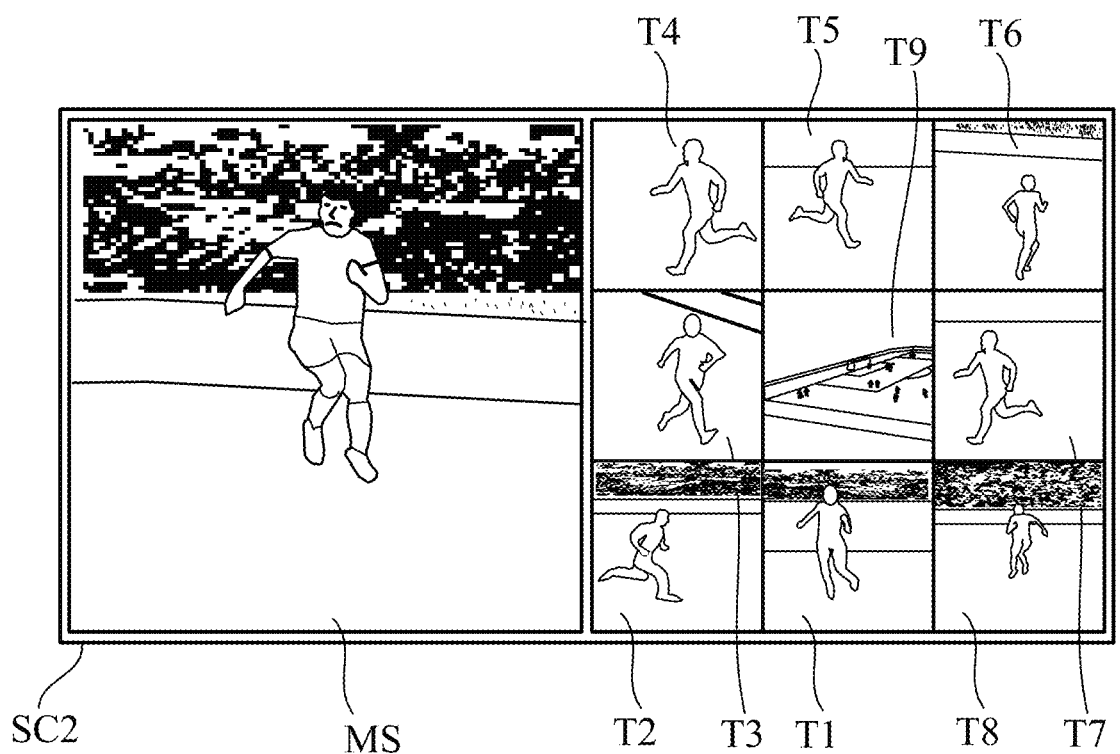
FIG. 14 shows another game watching screen displayed on the display device of the reproduction device in player-whole-body tracking mode.

Then, as shown in FIG. 14, the moving image that was displayed in the thumbnail display portion T4 is enlarged and displayed in the main display portion MS. On the other hand, the moving image taken by the main camera MC that was displayed in the main display portion MS is reduced in size and displayed in the thumbnail display portion T9, which was blank. The images are switched in this way. In the thumbnail display portion T2, a blank may be displayed, or the moving image ranked next (number 9 in the embodiment) in the player-whole-body tracking mode may be displayed. Thus, the user can watch the moving image of most interest taken by one UE 30 in an enlarged format on the main display portion MS, and can watch the moving images taken by the main camera MC and other eight UEs 30 on the thumbnail display portions T1 to T9.

Thereafter, the user may continue in this state, or if his/her interest shifts to another moving image displayed in any of the thumbnail display portions T1 to T9 in the game watching screen SC2, the user may select another moving image with the pointing device by clicking or touching any of the thumbnail display portions T1 to T9. The selected moving image is enlarged and displayed on the main display portion MS. If the user clicks or touches the central thumbnail display portion T9, the moving image captured by the main camera MC is enlarged and displayed on the main display portion MS in the same way as in the initial screen. In this way, the user can switch the main moving image to that he/she wants to focus on in the main display portion MS while watching the multiple moving images.

Illustration of the game watching screen of the player-face tracking mode is omitted. The game watching screen of the player-face tracking mode differs from the game watching screen SC2 of the player-whole-body tracking mode in that a player's face is displayed as an object in a large size in the main display portion MS and thumbnail display portions T1 to T9. From FIGS. 13 and 14 and the relevant explanations above, those skilled in the art will understand the game watching screen of the player-face tracking mode. In the game watching screen of the player-face tracking mode, the user can also switch the main moving image that he/she wishes to focus on in the main display portion MS.

Figure 15:
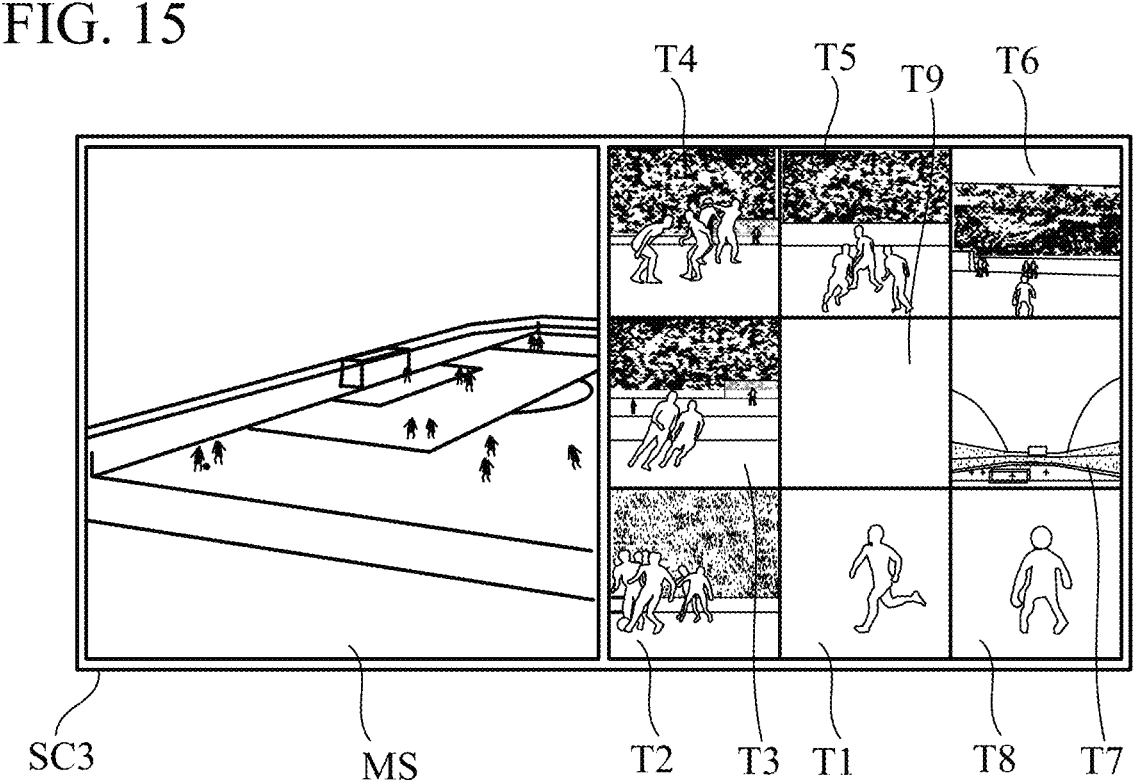
FIG. 15 shows a game watching screen displayed on the display device of the reproduction device in a continuous section observation mode.

FIG. 15 shows an initial screen of the game watching screen SC3 that is displayed on the display device of the reproduction device 13 in the continuous section observation mode. For the game watching screen SC3 in FIG. 15, it is assumed that the user of the reproduction device 13 has selected section Z5.

In the initial screen of the continuous section observation mode, the moving image captured by the main camera MC (see FIG. 6) is displayed in the main display portion MS, and moving images captured by cameras 32 of UEs 30 of spectators in the stadium are displayed in the thumbnail display portions T1 to T8. Nothing is displayed in the central thumbnail display portion T9. In this mode, the moving images in the thumbnail display portions T1 through T8 correspond to regions R1 through R8 in the stadium, respectively. That is, the moving image displayed in the thumbnail display portion T1 is a moving image taken by a UE 30 of a spectator in region R1, the moving image displayed in the thumbnail display portion T2 is a moving image taken by a UE 30 of a spectator in region R2, and the moving image displayed in the thumbnail display portion T8 is a moving image taken by a UE 30 of a spectator in region R8. More specifically, the moving image displayed in each thumbnail display portion is a moving image ranked higher (number 1 in the embodiment) among multiple moving images, taken by spectators' UEs 30 in the region corresponding to that thumbnail display portion. Therefore, in the initial screen of the continuous section observation mode, the user of the reproduction device 13 can watch the larger moving image taken at one point in the stadium by the main camera MC on the main display portion MS, and can watch individual smaller moving images of the selected section taken from regions R1 to R8 on the thumbnail display portions T1 to T8.

As the game develops, many spectators will follow the movement of the soccer ball, and few spectators will continuously gaze at or capture a single section. However, some spectators will track their favorite players. In addition, it is possible to see the entire field F from any regions. In particular, the field of view of a camera 32 of a UE 30 that is located on a second-floor seat 2F will likely include a distant section along with other sections. For example, if the ball is in section Z8, a camera 32 of a UE 30 located in a second-floor seat 2F in region R6 will be pointed at section Z8, but the camera 32 might still capture section Z2. However, if there is no moving image in one region that is capturing the section that the user has selected, nothing may be displayed in the thumbnail display portion corresponding to the region. For example, if the user selects section Z2 and there is no UE 30 located in region R8 that is capturing section Z2, the thumbnail display portion T8 corresponding to region R8 may display a blank. The user may observe section Z2 by other thumbnail display portions.

The user of the reproduction device 13 can select with the pointing device a moving image that the user wants to focus on. For example, if the user wants to focus on the moving image displayed in the thumbnail display portion T8, the user clicks or touches the thumbnail display portion T8 with the pointing device. When the user clicks or touches his/her preferred thumbnail display portion with the pointing device, the GUI supplies an image switching command to the CPU.

Figure 16:
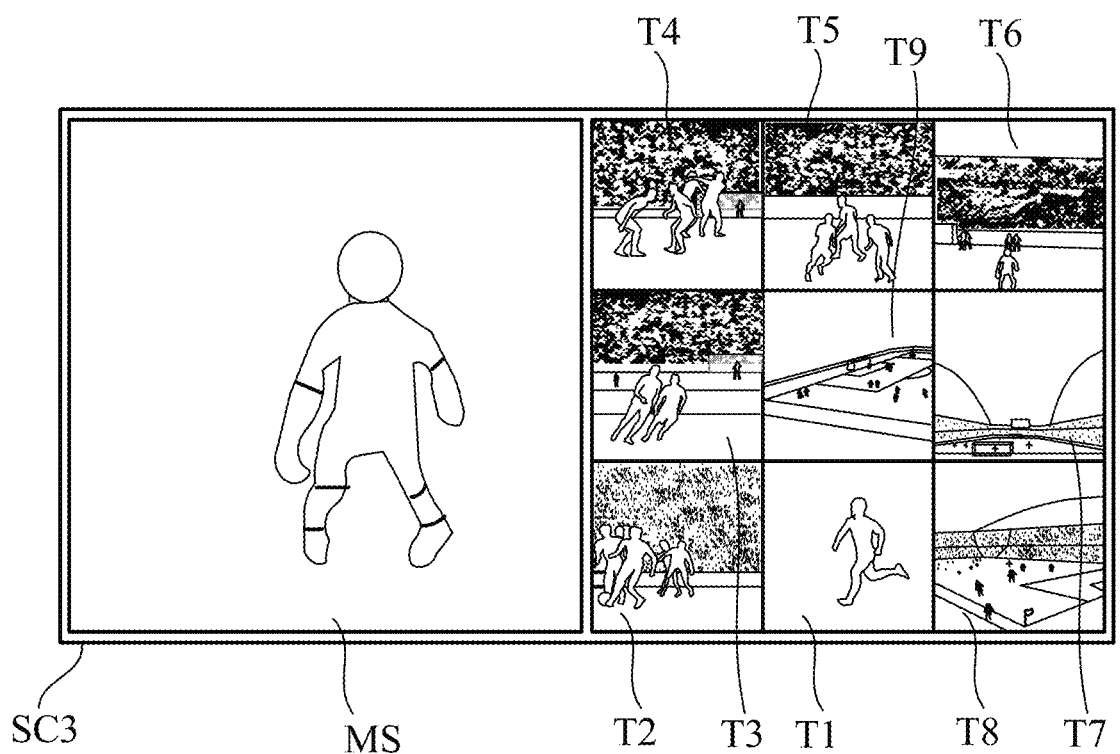
FIG. 16 shows another game watching screen displayed on the display device of the reproduction device in the continuous section observation mode.

Then, as shown in FIG. 16, the moving image that was displayed in the thumbnail display portion T8 is enlarged and displayed in the main display portion MS. On the other hand, the moving image taken by the main camera MC that was displayed in the main display portion MS is reduced in size and displayed in the thumbnail display portion T9, which was blank. The images are switched in this way. In the thumbnail display portion T8, a blank may be displayed, or the moving image ranked next (number 2 in the embodiment) captured from region R8 in the continuous section observation mode may be displayed. Thus, the user can watch the moving image of most interest taken by one UE 30 in an enlarged format on the main display portion MS, and can watch the moving images taken by the main camera MC and the other eight UEs 30 on the thumbnail display portions T1 to T9.

Thereafter, the user may continue in this state, or if his/her interest shifts to another moving image displayed in any of the thumbnail display portions T1 to T9 in the game watching screen SC3 (i.e., a moving image taken by the main camera MC or taken from other regions), the user may select another moving image with the pointing device by clicking or touching any of the thumbnail display portions T1 to T9. The selected moving image is enlarged and displayed on the main display portion MS. If the user clicks or touches the central thumbnail display portion T9, the moving image captured by the main camera MC is enlarged and displayed on the main display portion MS in the same way as in the initial screen. In this way, the user can switch the main moving image to that he/she wants to focus on in the main display portion MS while watching the multiple moving images.

Figure 17:
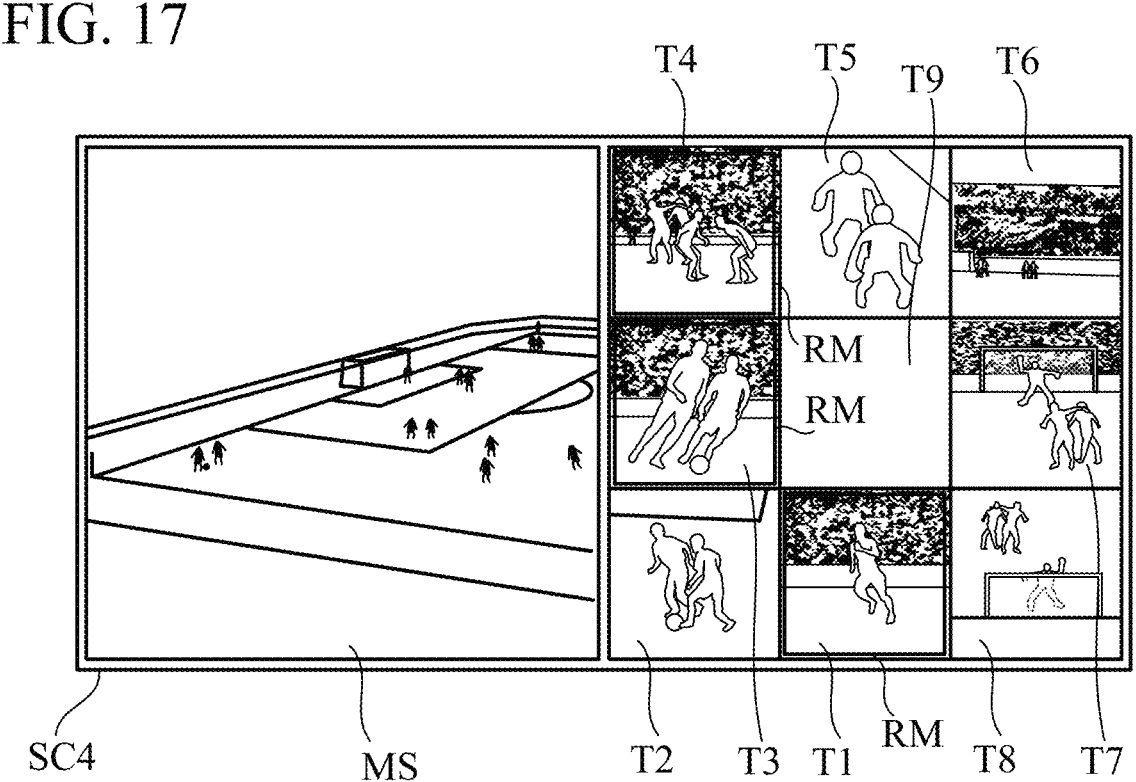
FIG. 17 shows a game watching screen displayed on the display device of the reproduction device in a goal prediction mode.

FIG. 17 shows an initial screen of the game watching screen SC4 that is displayed on the display device of the reproduction device 13 in the goal prediction mode.

In the initial screen of the goal prediction mode, the moving image captured by the main camera MC (see FIG. 6) is also displayed in the main display portion MS, and moving images captured by cameras 32 of UEs 30 of spectators in the stadium are displayed in the thumbnail display portions T1 to T8. Nothing is displayed in the central thumbnail display portion T9. In this mode, the moving images in the thumbnail display portions T1 to T8 are moving images ranked higher (number 1 to 8 in the embodiment) among multiple moving images, taken by spectators' UEs 30, of players who are likely to be associated with a next score, regardless of regions R1 to R8 or sections Z1 to Z8 in the stadium. Thus, in the initial screen of the goal prediction mode, the user of the reproduction device 13 can watch the larger moving image taken at one point in the stadium by the main camera MC on the main display portion MS, and can watch individual smaller moving images tracking the players likely to be associated with the score taken from multiple directions on the thumbnail display portions T1 to T8.

In goal prediction mode, the direction of movement of the soccer ball B, which is the object of interest in this mode, is estimated by the CPU of the CU 1. In the game watching screen SC4 of the goal prediction mode, at least one recommended mark RM is assigned to at least one moving image (recommended moving image) capturing at least one section corresponding to the candidate direction of movement of the soccer ball B that has been estimated. In FIG. 17, the outlines of thumbnail display portions T1, T3, and T4 are represented by thick lines. The outline expressed with thick lines is an example of the recommended mark RM, and the moving images displayed in the thumbnail display portions T1, T3, and T4 are the recommended moving images. However, the recommended mark RM may be a blinking outline of the thumbnail display portion, or a special colored outline of the thumbnail display portion.

The user of the reproduction device 13 can select with the pointing device a moving image that the user wants to focus on. For example, if the user likes the moving image displayed in the thumbnail display portion T8, the user clicks or touches the thumbnail display portion T8 with the pointing device. When the user clicks or touches his/her preferred thumbnail display portion with the pointing device, the GUI provides the CPU with an image switching command.

Figure 18:
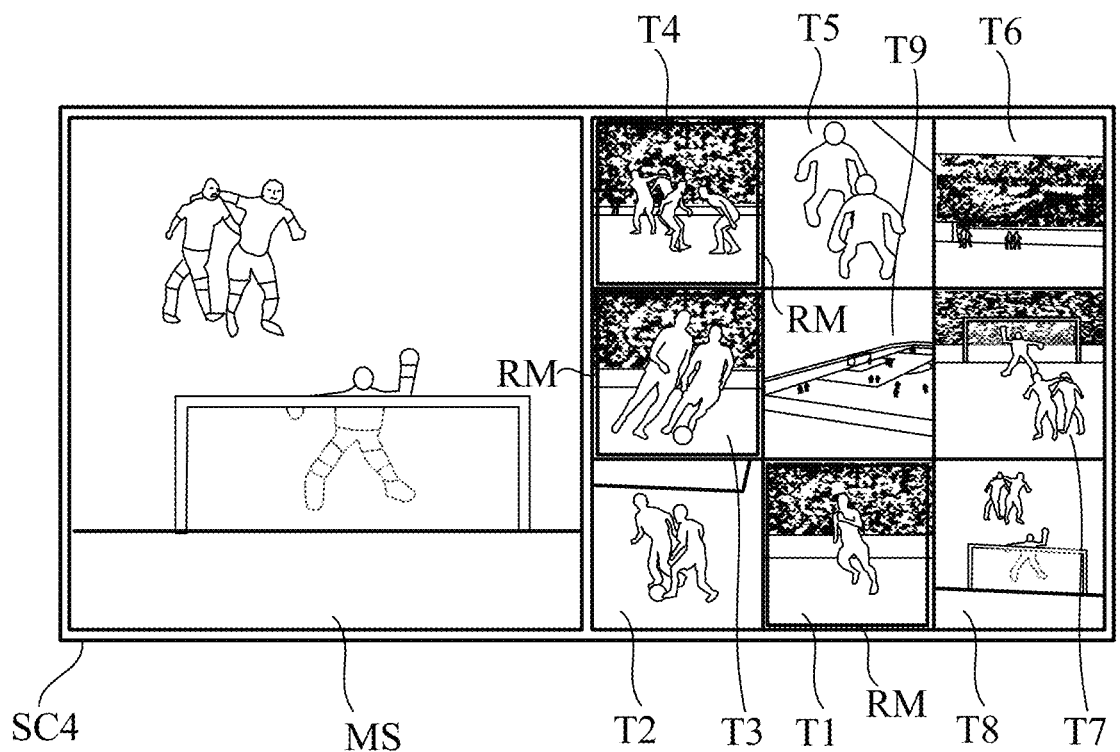
FIG. 18 shows another game watching screen displayed on the display device of the reproduction device in the goal prediction mode.

Then, as shown in FIG. 18, the moving image that was displayed in the thumbnail display portion T8 is enlarged and displayed in the main display portion MS. On the other hand, the moving image taken by the main camera MC that was displayed in the main display portion MS is reduced in size and displayed in the thumbnail display portion T9, which was blank. The images are switched in this way. In the thumbnail display portion T8, a blank may be displayed, or the moving image ranked next (number 9 in the embodiment) in the goal prediction mode may be displayed. Thus, the user can watch the moving image of most interest taken by one UE 30 in an enlarged format on the main display portion MS, and can watch the moving images taken by the main camera MC and other eight UEs 30 on the thumbnail display portions T1 to T9. The recommended mark RM is also displayed in this overall moving image.

Thereafter, the user may continue in this state, or if his/her interest shifts to another moving image displayed in any of the thumbnail display portions T1 to T9 in the game watching screen SC4, the user may select another moving image with the pointing device by clicking or touching any of the thumbnail display portions T1 to T9. The selected moving image is enlarged and displayed on the main display portion MS. If the user clicks or touches the central thumbnail display portion T9, the moving image captured by the main camera MC is enlarged and displayed on the main display portion MS in the same way as in the initial screen. In this way, the user can switch the main moving image to that he/she wants to focus on in the main display portion MS while watching the multiple moving images.

FIG. 19 is a flowchart showing an operation in the reproduction device 13. This operation starts when the user of the reproduction device 13 selects the ball tracking mode on the mode selection screen SS in FIG. 8 and clicks or touches the confirmation button. This operation also starts when the user of the reproduction device 13 selects the player-whole-body tracking mode or the player-face tracking mode on the mode selection screen SS of FIG. 8, clicks or touches the confirmation button, selects a player of his/her choice on the player selection screen PS of FIG. 9, and clicks or touch confirmation button. This operation also starts when the user of the reproduction device 13 selects the continuous section observation mode on the mode selection screen SS in FIG. 9, clicks or touches the confirmation button, selects the desired section on the section selection screen ZS in FIG. 10, and then clicks or touches the confirmation button.

In step S1, the CPU of the reproduction device 13 receives an overall video signal (i.e., overall moving image signal) from the Internet 12 via the communication interface. In step S1, the reproduction device 13 may receive all the overall video signals for the ball tracking mode, the player-whole-body tracking mode, the player-face tracking mode, and the continuous section observation mode, but for the sake of traffic reduction, it is preferable that the reproduction device 13 receive only the overall video signal of the mode selected by the user (and of the object selected by the user). That is, if the user selects the ball tracking mode, the overall video signal received in step S1 includes video signals indicating the multiple moving images exemplified in FIGS. 11 and 12. If the user selects the player-whole-body tracking mode, the overall video signal received in step S1 includes video signals indicating the multiple moving images exemplified in FIGS. 13 and 14. If the user selects the continuous section observation mode, the overall video signal received in step S1 includes video signals indicating the multiple moving images exemplified in FIGS. 15 and 16. In any case, the overall video signal has a format that enables simultaneous reproduction of multiple moving images corresponding to the multiple video signals on the reproduction device 13, and has an instruction indicating that each moving image should be displayed in one of the main display portion MS and thumbnail display portions T1 to T9.

In step S2, the CPU of the reproduction device 13 displays multiple moving images on the display device based on the overall video signal. If the user selects the ball tracking mode, the CPU of the reproduction device 13 displays, for example, the game watching screen SC1 illustrated in FIG. 10 as an initial screen. When the user selects the player-whole-body tracking mode, the CPU of the reproduction device 13 displays, for example, the game watching screen SC2 illustrated in FIG. 13 as an initial screen. When the user selects the continuous section observation mode, the CPU of the reproduction device 13 displays, for example, the game watching screen SC3 illustrated in FIG. 15 as the initial screen.

In step S3, the CPU of the reproduction device 13 determines whether or not the user of the reproduction device 13 has given an image switching command. As described above, an image switching command is supplied to the CPU from the GUI when the user clicks or touches any of the thumbnail display portions T1 to T9 on a game watching screen.

If the determination in step S3 is affirmative, the operation proceeds to step S4, in which the CPU of the reproduction device 13 switches the game watching screen according to the user's image switching command. For example, as described above, the game watching screen in FIG. 11, 13 or 15 is switched to the game watching screen in FIG. 12, 14 or 16. Thereafter, the operation proceeds to step S5.

If the determination in step S3 is negative, the operation proceeds to step S5. In step S5, the CPU of the reproduction device 13 determines whether or not the user has already reserved the goal prediction mode (see FIG. 8).

If the determination in step S5 is negative, the operation proceeds to step S6. In step S6, the CPU of the reproduction device 13 determines whether or not the user has given an end-of-watching command. The end-of-watching command is supplied by the GUI to the CPU when the user gives a command indicating that he/she wishes to end watching the game to the GUI. If the determination in step S6 is affirmative, the operation ends. If the user wishes to watch the game in a different mode from the one currently being watched, the user can give the GUI a command indicating that he/she wishes to terminate watching the game, and then can select a new mode on the mode selection screen SS in FIG. 8.

If the determination in step S6 is negative, the operation returns to step S1, and the user can watch multiple moving images in the mode currently being watched.

On the other hand, if the determination in step S5 is affirmative, the operation proceeds to step S7, in which the CPU of the reproduction device 13 determines whether or not a special overall video signal (i.e., special overall moving image signal) has been received from the Internet 12 via the communication interface. The special overall video signal is a signal generated by the CU 1 when a goal is predicted (when a special occurrence is predicted in an event), and includes multiple video signals for the goal prediction mode. The special overall video signal is provided by the CU 1 only when the CU 1 determines that a goal, i.e., a score is predicted in the soccer game being played in the stadium. Therefore, in cases of normal game development, the determination in step S7 is negative. If the decision of step S7 is negative, the operation proceeds to step S6.

If the special overall video signal has been received and the determination in step S7 is affirmative, the operation proceeds to step S8, in which the CPU of the reproduction device 13 displays multiple moving images on the display device based on the special overall video signal. In other words, the reproduction device 13 enters the goal prediction mode. The CPU of the reproduction device 13 displays, for example, the game watching screen SC4 illustrated in FIG. 17 as an initial screen.

In step S9, the CPU of the reproduction device 13 determines whether or not the user of the reproduction device 13 has given an image switching command. As described above, the image switching command is supplied to the CPU from the GUI when the user clicks or touches any of the thumbnail display portions T1 to T9 of the game watching screen SC4.

If the determination in step S9 is affirmative, the operation proceeds to step S10, in which the CPU of the reproduction device 13 switches the game watching screen SC4 according to the user's image switching command. For example, as described above, the game watching screen SC4 in FIG. 17 is switched to the game watching screen SC4 in FIG. 18. Thereafter, the operation returns to step S7.

If the determination in step S9 is negative, the operation returns to step S7. Therefore, as long as the special overall video signal is supplied from the CU 1, the loop from step S7 to S9 or S10 is repeated, and the goal prediction mode continues in the reproduction device 13.

Figure 20:
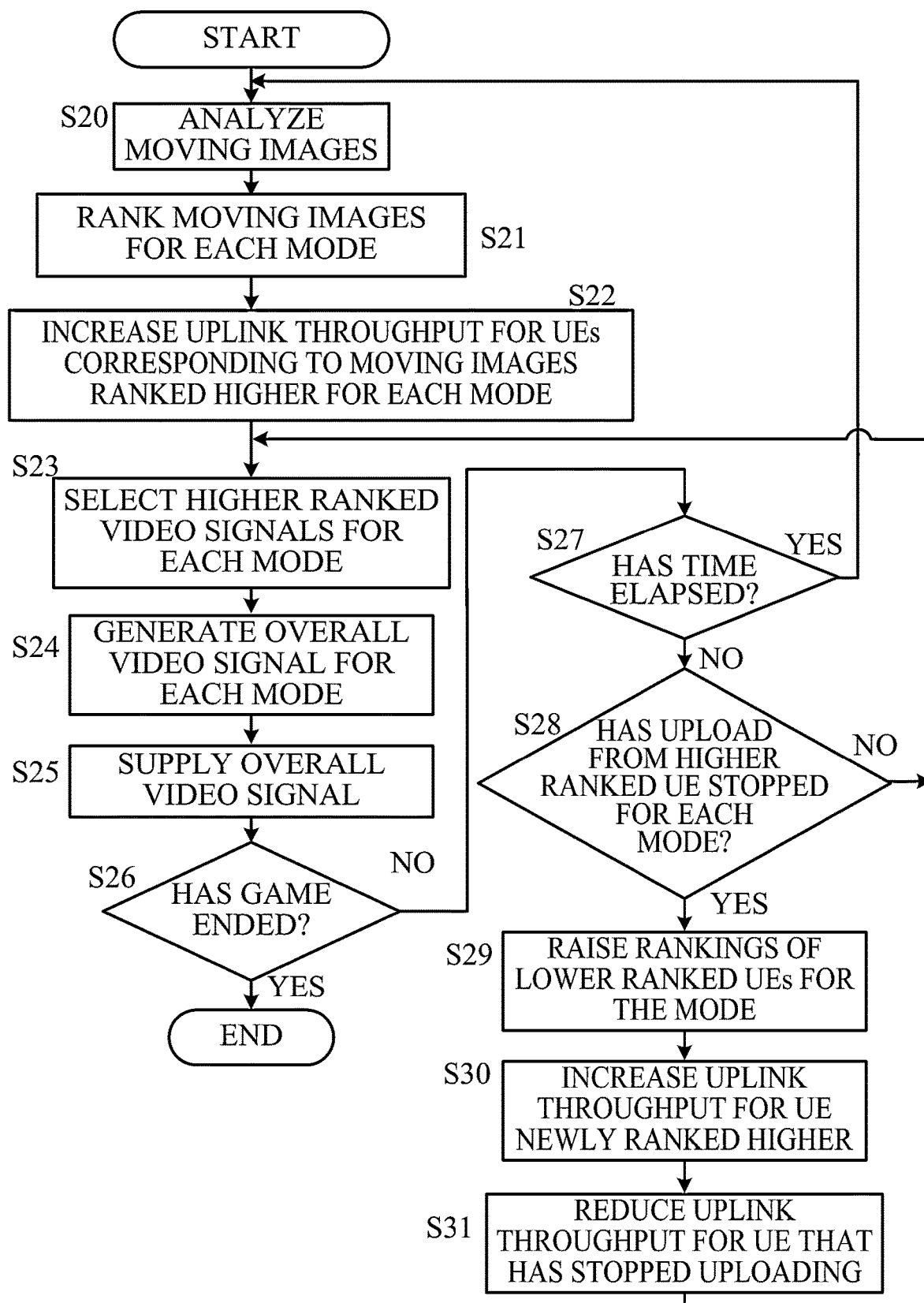
FIG. 20 is a flowchart of a communication control method executed by a network management device according to an embodiment of the present disclosure.

FIG. 20 is a flowchart of the communication control method for supplying an overall video signal executed by the CU 1, which is the network management device. This method is executed for the ball tracking mode, the player-whole-body tracking mode, and the player-face tracking mode.

In step S20, the CPU of the CU 1 analyzes moving images uploaded from UEs 30 in the stadium. The points to be analyzed are at least the resolution of each moving image and the ratio of the area of the desired object in each moving image. In addition, the points to be analyzed may include the angle of view of each moving image, the position of each UE 30 (e.g., first-floor seat 1F or second-floor seat 2F, and the distance to the object), and the upload speed of the moving image from each UE 30.

The resolution of the moving image is the resolution of the camera 32 of the UE 30 that captures the moving image and is identified by identifying the model of the UE 30 from the MAC address and/or the IMSI (International Mobile Subscriber Identity) of the UE 30.

The desired object corresponds to the object in the moving image and depends on the mode to be reproduced. Specifically, the desired object is the soccer ball in the ball tracking mode, a player's full body in the player-whole-body tracking mode, and a player's face in the player-face tracking mode. The CPU of the CU 1 calculates the ratio of the area of object in the moving image for each of these modes and for each of these individual objects.

In step S21, the CPU of the CU 1 executes a ranking process for the multiple modes in parallel. In the ranking process, multiple moving images simultaneously capturing the soccer game being played in the stadium are ranked. In the ranking process, moving images with better resolution are ranked higher and moving images with a greater ratio of the area of the desired object in the moving images are ranked higher. For example, for the ball tracking mode, based on the resolution of the moving images and the ratio of the area of the soccer ball in the moving images, moving images with better resolution are ranked higher and moving images with a greater area ratio are ranked higher.

For example, each moving image may be given a first weighting that is greater as the resolution is better and a second weighting that is greater as the ratio of the area of the desired object in the moving image is greater, and the sum or product of the first and second weightings may be calculated. A higher ranking may then be given to the moving image for which the sum or product of the weightings is greater. The CPU of the CU 1 stores the ranking results in the RAM or HDD of the CU 1.

In the ranking process, in addition to considering the resolution and the ratio of the area of the desired object in the moving images, moving images taken by cameras 32 of UEs 30 to which the distance to the desired object is shorter may be ranked higher. For example, each moving image may be given a third weighting that is greater as the distance from the camera 32 to the desired object is shorter, and the sum or product of the first, second, and third weightings may be calculated. The moving image with a greater sum or product of the weightings may then be given a higher ranking. As a result, for example, for the player-whole-body tracking mode, for each player, the moving images from the UEs 30 that are closer to the player can be ranked higher in the ranking process. Furthermore, the upload speed of the moving images from the UEs 30 may be taken into account in the ranking process.

Figure 21:
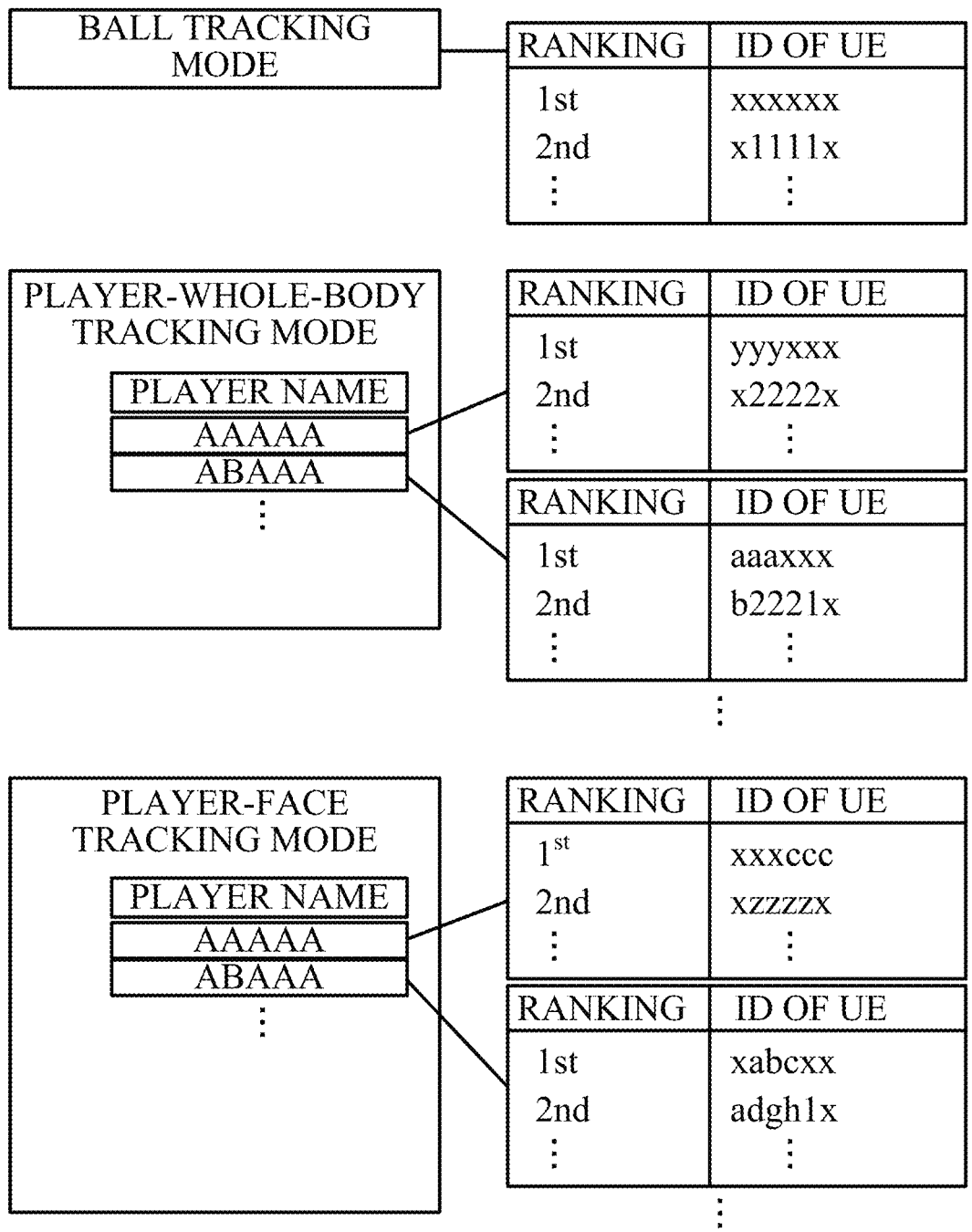
FIG. 21 is a conceptual diagram showing ranking results stored in the network management device in the method of FIG. 20.

FIG. 21 conceptually shows the ranking results stored in the RAM or HDD of the CU 1 in the method of FIG. 20.

As shown in FIG. 21, for the ball tracking mode, the IDs of the UEs 30 that capture highly ranked moving images are stored along with their rankings. The ID to be stored may be an IMSI, a MAC address, or an ID identified only by the CU 1 in the stadium, for example, the ticket number of the owner of the UE 30. The number of UEs 30 to be stored is equal to or greater than the number of the initial thumbnail moving images (eight in the embodiment) displayed in the thumbnail display portions T1 to T8. In other words, the IDs of at least the first-place to eighth-place UEs 30 are stored. Since one or more of the image shooters of the highly ranked moving image may stop image shooting, it is preferable to store the IDs of UEs 30 be more than the number of the thumbnail moving images.

For the player-whole-body tracking mode and the player-face tracking mode, for each object, i.e., for each player, the IDs of the UEs 30 that capture highly ranked moving images are stored along with their rankings. For each player, the number of UEs 30 to be stored is equal to or greater than the number of the initial thumbnail moving images.

In step S22, the CPU of the CU 1 executes a throughput-increasing process. In the throughput-increasing process, the uplink throughput is increased for the multiple UEs 30, stored in the RAM or HDD of the CU 1, that correspond to the moving images ranked higher in the ranking process.

The CPU of the CU 1 executes the throughput-increasing process for the multiple modes in parallel. For the ball tracking mode, at least the first-place to eighth-place UEs 30 are selected and the uplink throughput for the UEs 30 is increased. For the player-whole-body tracking mode and player-face tracking mode, at least the first-place to eighth-place UEs 30 are selected for each player, and the uplink throughput of the UEs 30 is increased.

The specific manner for increasing the uplink throughput is one or a suitable combination of the following techniques.

The CPU of the CU 1 may perform a first postcoding adjustment process. In the first postcoding adjustment process, the CPU of the CU 1 instructs at least one RU 20 with which the selected UEs 30 communicate to switch the postcoding scheme from ZF postcoding or MMSE postcoding to MLD postcoding. Following the instruction, the RU 20 switches the postcoding scheme. Thus, in uplink reception beamforming, interference from other UEs to the selected UEs 30 is reduced and the reception quality of the transmitted beams from the selected UEs 30 at the RU is improved. With the improved reception quality, the number of automatic retransmission requests from the RU 20 is reduced, resulting in increased wireless communication throughput. Therefore, the uplink wireless communication quality and uplink wireless communication throughput can be increased for the selected UEs 30.

In the first postcoding adjustment process, instead of switching the postcoding scheme, the CPU of the CU 1 may instruct the at least one RU 20 to input a reception power or a reception quality that is lower than the reception power or the reception quality in the channel state information report reported from each of the selected UEs 30 to at least one of the postcoder 25 and the reception beamformer 26 of the RU 20. The reception quality of the transmitted beams from the selected UEs 30 at the RU is improved since the reception power or the reception quality that is lower than the actually measured reception power or the actually measured reception quality is input to at least one of the postcoder 25 and reception beamformer 26. With the improved reception quality, the number of automatic retransmission requests from the RUs is reduced, resulting in increased wireless communication throughput. Therefore, the uplink wireless communication quality and uplink wireless communication throughput can be increased for the selected UEs 30. In this case, the postcoding scheme of the RU 20 remains unchanged, so that the reception quality, at the RU, of the transmitted beams from other UEs in the neighborhood of the selected UEs 30 is not improved.

The CPU of the CU 1 may request the E2EO to assign dedicated slices to the selected UEs to be used for communication for the selected UEs 30. Upon the request, the E2EO gives a command to the slice manager to assign the dedicated slices to the selected UEs 30. Thus, the uplink communication quality and uplink throughput can be enhanced for the selected UEs 30.

The CPU of the CU 1 may instruct at least one RU 20 with which the selected UEs 30 communicate to assign more resource blocks in the PUSCH for the selected UE 30 than usual. In accordance with the instruction, the RU 20 assigns more resource blocks than usual to the selected UEs 30. Thus, the uplink throughput can be increased for the selected UEs 30.

In step S23, the CPU of the CU 1 selects higher ranked video signals. The selection is executed in parallel for the aforementioned multiple modes. For the ball tracking mode, the first-place to eighth-place UEs 30 are selected. For the player-whole-body tracking mode and the player-face tracking mode, the first-place to eighth-place UEs 30 are selected for each player. The uplink throughput is increased in step S22 for the UEs 30 that capture the moving images.

In step S24, the CPU of the CU 1 executes an overall video signal generation process in parallel for each of the aforementioned multiple modes. In the overall video signal generation process, an overall video signal including multiple video signals corresponding to the selected UEs 30 with increased uplink throughput is generated.

In step S25, the CPU of the CU 1 executes an overall video signal supplying process. In the overall video signal supplying process, the overall video signal generated by the overall video signal generation process is supplied to at least one reproduction device 13 that requests the overall video signal. The overall video signal supplied by the overall video signal supplying process has a format that enables the reproduction device 13 to simultaneously reproduce multiple moving images corresponding to the multiple video signals included in the overall video signal. The overall video signal also has an instruction indicating each moving image should be displayed in one of the main display portion MS and thumbnail display portions T1 to T9.

Therefore, the display screen of the reproduction device 13 in which the ball tracking mode is selected displays the game watching screen SC1 illustrated in FIG. 11. The display screen of the reproduction device 13 in which the player-whole-body tracking mode is selected displays the game watching screen SC2 illustrated in FIG. 13.

As described above, the CPU of the CU 1 may supply the overall video signals for all selectable modes to each reproduction device 13, but for the sake of traffic reduction, it is preferable to supply the overall video signal for the mode selected by the user of each reproduction device 13 (and also for the desired object selected by the user). If different modes are selected in different reproduction devices 13, the CPU of the CU 1 supplies the overall video signals for multiple modes to the destination reproduction devices 13 in step S25 to match the selection in the destination reproduction devices 13.

In step S26, the CPU of the CU 1 determines whether or not the game has ended from the moving image captured by the main camera MC. If the determination in step S26 is affirmative, the operation ends, but if the determination in step S26 is negative, the operation proceeds to step S27.

In step S27, the CPU of the CU 1 determines whether or not a predetermined time has elapsed. If the operation proceeds to step S27 for the first time, the time is counted from the start of the operation. If the operation proceeds to step S27 for the second or subsequent times, the time is counted from the previous step S27. The predetermined time is, for example, 10, 15, or 20 minutes. If the determination in step S27 is affirmative, the operation returns to step S20, and analysis of moving images (step S20) and the moving image ranking process (step S21) are executed again. On the other hand, if the determination in step S27 is negative, the operation proceeds to step S28.

In step S28, the CPU of the CU 1 determines, for each of the ball tracking mode, the player-whole-body tracking mode, and the player-face tracking mode, whether or not the supply, i.e., uploading of the moving images from one or more of the highly ranked UEs 30 corresponding to the moving images included in the overall video signal (used in the overall video signal generation process) has stopped.

If the determination in step S28 is negative, the operation returns to step S23. On the other hand, if the determination in step S28 is affirmative, the operation proceeds to step S29, in which a rank-raising process is executed for the mode in which uploading of one or more moving images from highly ranked UEs 30 has stopped. In the rank-raising process, the rankings of UEs 30 following the UE 30 that has stopped uploading the moving image are raised.

Next, in step S30, the CPU of the CU 1 increases the uplink throughput for the UE 30 newly ranked higher as a result of the rank-raising process. The specific manner for increasing the uplink throughput is the same as the throughput-increasing process in step S22. That is, one or an appropriate combination of switching the postcoding scheme, inputting the lower reception power or reception quality into at least one of the postcoder 25 and reception beamformer 26, assigning dedicated slices, and increasing the number of PUSCH resource blocks is executed.

Next, in step S31, the CPU of the CU 1 reduces the uplink throughput for at least one UE 30 that was highly ranked, but has stopped uploading the moving image.

The specific manner for uplink throughput reduction may be one or an appropriate combination of the following techniques.

The CPU of the CU 1 may perform a second postcoding adjustment process. In the second postcoding adjustment process, the CPU of the CU 1 instructs at least one RU 20 with which the selected UEs 30 communicates to switch the postcoding scheme from MLD postcoding to ZF postcoding or MMSE postcoding. Following the instruction, the RU 20 switches the postcoding scheme. Thus, in uplink reception beamforming, interference from other UEs to the selected UEs 30 increases and the reception quality of the transmit beam from the selected UE 30 at the RU degrades. As the reception quality decreases, the number of automatic retransmission requests from the RU 20 increases, resulting in a decrease in wireless communication throughput. Therefore, the uplink wireless communication quality and uplink wireless communication throughput for the selected UEs 30 will decrease.

In the second postcoding adjustment process, instead of switching the postcoding scheme, the CPU of the CU 1 may instruct the at least one RU 20 to input the reception power or the reception quality in the channel state information report reported from each of the selected UEs 30 to at least one of the postcoder 25 and the reception beamformer 26 of the RU 20. Inputting the actual measured reception power or the actual reception quality to at least one of the postcoder 25 and the reception beamformer 26 causes the reception quality, at the RU, of the transmitted beam from the selected UEs 30 to decrease (back to the reception quality in normal uplink beamforming). As the reception quality decreases, the number of automatic retransmission requests from the RU increases, resulting in a decrease in wireless communication throughput. Therefore, the uplink wireless communication quality and uplink wireless communication throughput will be reduced for the selected UEs 30.

The CPU of the CU 1 may request the E2EO to eliminate the assignment of the dedicated slice for the selected UE 30. Upon the request, the E2EO gives a command to the slice manager to eliminate the assignment of the dedicated slice for the UE. Thus, the uplink communication quality and uplink throughput are degraded for the UE 30.

The CPU of the CU 1 may instruct at least one RU 20 with which the selected UE 30 communicates to return the PUSCH resource block for the selected UE 30 to normal. In accordance with the instruction, RU 20 assigns only the normal resource block to the UE 30. Thus, the uplink throughput can be reduced for the selected UE 30.

Steps S28-S31 are executed for the UEs capturing each player for the player-whole-body tracking mode and the player-face tracking mode.

By returning the operation to step S23, the CPU of the CU 1 repeatedly executes the overall video signal generation process (step S24) and the overall video signal supplying process (step S25) based on the moving images continuously uploaded from highly ranked UEs 30. In the embodiment, once the CPU of the CU 1 executes the ranking process (step S21), until a predetermined time elapses from the ranking process (until the determination in step S27 becomes affirmative), the CPU of the CU 1 repeats the overall video signal generation process (step S24) and the overall video signal supplying process (step S25) on the basis of the moving images continuously supplied from the UEs 30 selected by the previous ranking process. Thus, the number of ranking processes is minimized.

On the other hand, if uploading of a moving image ranked higher in the ranking process is stopped, rankings of the UEs in the subsequent ranks are raised (step S29), and the uplink throughput is increased for the newly high ranked UE 30. Therefore, even if uploading of a moving image used for the overall video signal is stopped, there is no need for a new ranking for all the moving images received by the CU 1.

When the predetermined time elapses (when the determination in step S27 becomes affirmative), the operation returns to step S20 since the image shooters do not necessarily continue to capture the same object. However, step S27 may be omitted.

According to the operation in FIG. 20, since the overall moving image that includes multiple higher-ranked moving images is supplied to the reproduction device 13, multiple moving images that may include moving images conforming to the preferences of the viewer can be provided simultaneously. In particular, since the uplink throughput is increased for the UEs 30 that upload the highly ranked moving images, the frame rate of the multiple moving images in the overall moving image reproduced on the display device of the reproduction device 13 can be increased, and high-definition moving images can be provided without discomfort.

When the user, i.e., viewer of the reproduction device 13 wants to focus on any of the thumbnail moving images, he/she can click or touch the thumbnail display portion with the pointing device and can watch the main moving image that is the enlarged thumbnail moving image on the main display portion MS.

In the operation of FIG. 20, the ranking process (step S21), the throughput-increasing process (step S22), and the overall video signal generation process (step S24) are executed in parallel for multiple modes in which the objects of the moving images to be reproduced differ, so that the operation is able to provide moving images for multiple modes that may match the various preferences of viewers.

In the ranking process (step S21), moving images with better resolution are ranked higher and moving images with a greater ratio of the area of the desired object in the moving images are ranked higher, so that moving images that conform to viewer's preferences as much as possible can be included in the overall moving image. Furthermore, by ranking moving images from the cameras that are closer to the desired object higher, moving images that match the viewer's preferences as much as possible can be included in the overall moving image.

Figure 22:
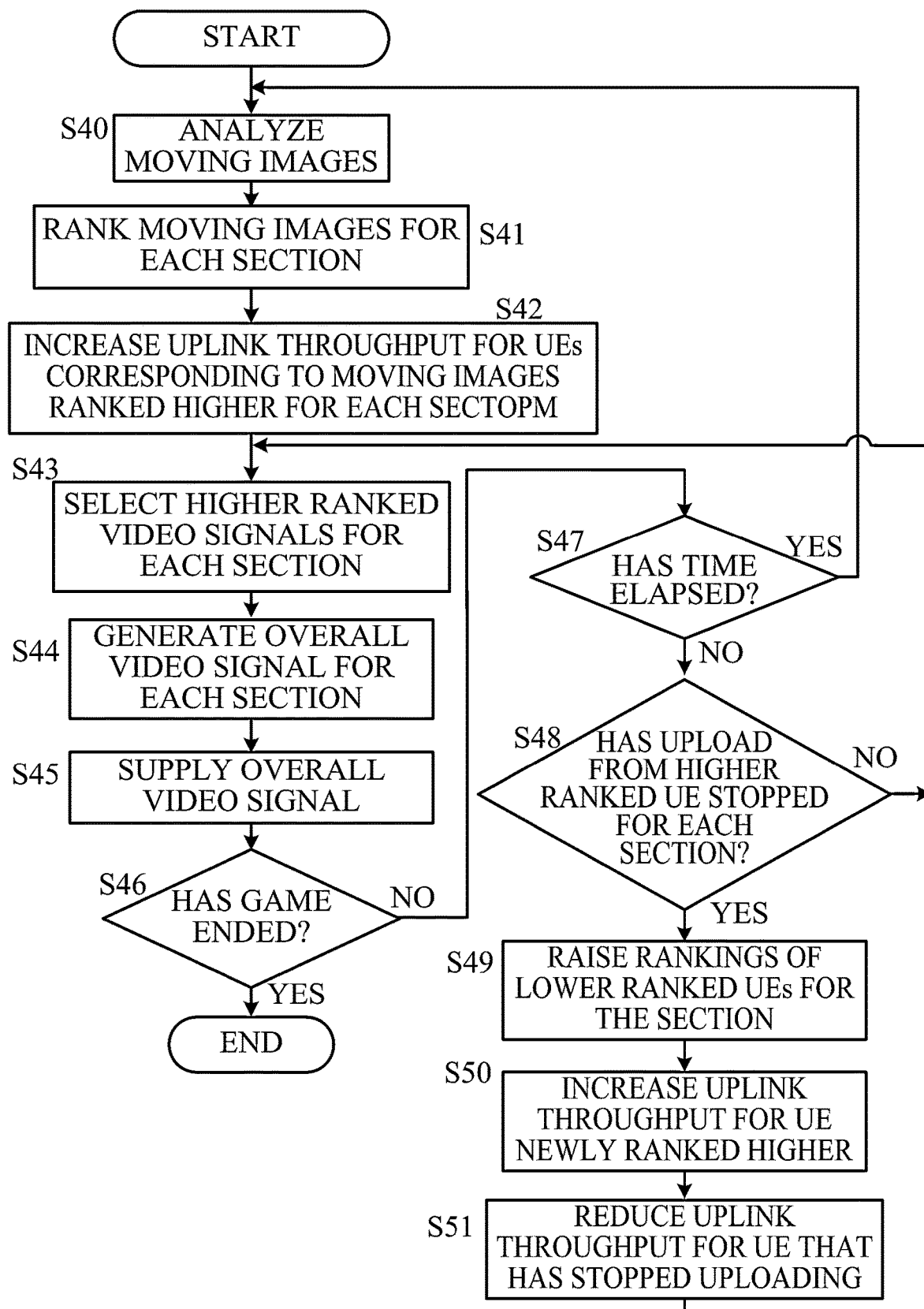
FIG. 22 is a flowchart of another communication control method executed by the network management device according to an embodiment of the present disclosure.

FIG. 22 is a flowchart of another communication control method for supplying an overall video signal executed by the CU 1, which is the network management device. This method is executed for the continuous section observation mode. The CPU of the CU 1 executes the operation of FIG. 20 and the operation of FIG. 22 in parallel.

In step S40, the CPU of the CU 1 analyzes moving images uploaded from UEs 30 in the stadium. The points to be analyzed are at least the resolution of each moving image and the ratio of the area of the desired object (one of sections Z1 to Z8) in each moving image. In addition, the points to be analyzed may include the position of each UE 30 (e.g., first-floor seat 1F or second-floor seat 2F) and the upload speed of the moving image from each UE 30.

The resolution of the moving image is the resolution of the camera 32 of the UE 30 that captures the moving image and is identified by identifying the model of the UE 30 from the MAC address and/or the IMSI (International Mobile Subscriber Identity) of the UE 30.

The desired object is one of sections Z1 to Z8 in the continuous section observation mode. The CPU of the CU 1 calculates the ratio of the area of the section in the moving image for each of sections Z1 to Z8.

In step S41, the CPU of the CU 1 executes a ranking process for the multiple sections in parallel. In the ranking process, multiple moving images simultaneously capturing each section in the stadium are ranked. In the ranking process, moving images with better resolution are ranked higher and moving images with a greater ratio of the area of the section in the moving images are ranked higher. For example, for section Z1, based on the resolution of the moving images and the ratio of the area of section Z1 in the moving image, moving images with better resolution are ranked higher and moving images with a large area ratio are ranked higher.

For example, each moving image may be given a first weighting that is greater as the resolution is better and a second weighting that is greater as the ratio of the area of the section in the moving image is greater, and the sum or product of the first and second weightings may be calculated. A higher ranking may then be given to the moving image for which the sum or product of the weightings is greater. The CPU of the CU 1 stores the ranking results in the RAM or HDD of the CU 1.

In the ranking process, in addition to considering the resolution and the ratio of area of the section in the moving images, moving images taken by cameras 32 of UEs 30 located in greater heights (elevations) from the field F may be ranked higher. For example, moving images taken by UEs in the second-floor seats 2F can be ranked higher than moving images taken by UEs in the first-floor seats 1F. For example, each moving image may be given a third weighting that is greater as the height from the field F is greater, and the sum or product of the first, second, and third weightings may be calculated. The moving image with a greater sum or product of the weightings may then be given a higher ranking. Furthermore, the upload speed of moving images from the UEs 30 may be taken into account in the ranking process.

However, if there are no moving images capturing a certain section, no ranking process is executed for the section.

The ranking process may be executed for each region in which UEs 30 are located. As a result, in the game watching screen SC4 in the continuous section observation mode, the moving images taken from regions R1 to R8 can be placed in the thumbnail display portions T1 to T8, respectively. Thus, the user of the reproduction device 13 can observe the moving images of a certain section taken from various angles.

Figure 23:
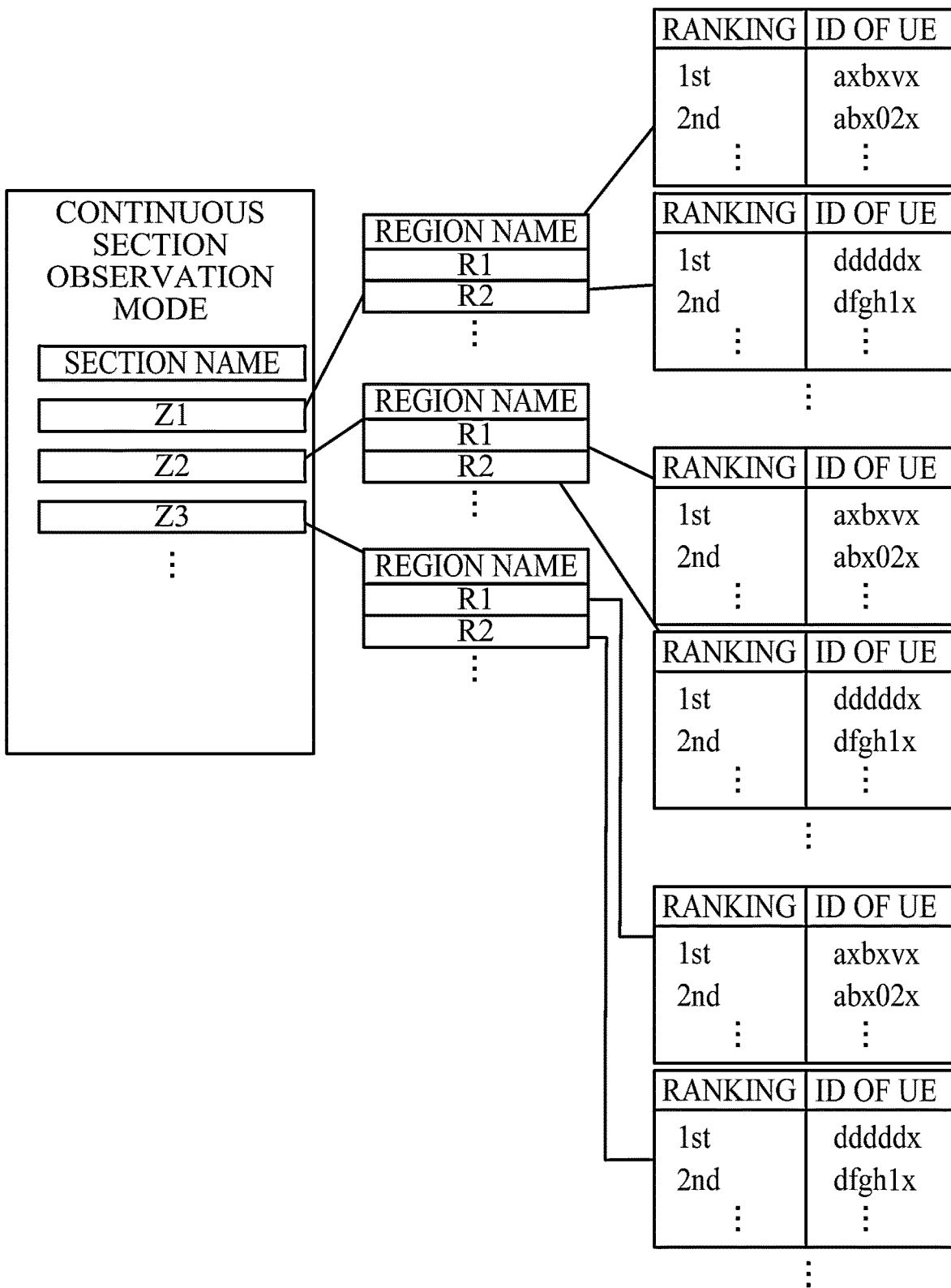
FIG. 23 is a conceptual diagram showing ranking results stored in the network management device in the method of FIG. 22.

FIG. 23 conceptually shows the ranking results stored in the RAM or HDD of the CU 1 in the method of FIG. 22.

As shown in FIG. 23, in the ranking process for the continuous section observation mode, the CPU of the CU 1 classifies moving images capturing each section by the region in which the UE capturing the image is located, and ranks them for each region. In a case in which the thumbnail display portions T1 to T8 correspond to regions R1 to R8, respectively, the number of UEs 30 to be stored for each region with respect to each section may be one. In other words, only the ID of the first-ranked UE 30 may be stored for each region and for each section. However, since the image shooter of the highest ranked moving image may stop image shooting, it is preferable to store the IDs of more than one UEs 30. If there are no moving images capturing a certain section, no IDs are stored for the section.

In step S42, the CPU of the CU 1 executes the throughput-increasing process. In the throughput-increasing process, the uplink throughput is increased for the multiple UEs 30, stored in the RAM or HDD of the CU 1, that correspond to the moving images ranked higher in the ranking process.

The CPU of the CU 1 executes the throughput-increasing process for the multiple sections in parallel. The CPU of the CU 1 selects at least one moving image ranked higher in each of the regions R1 to R8 (at least the highest ranked moving image for each region) for each of sections Z1 to Z8. Then, the CPU of the CU 1 increases the uplink throughput for the UEs 30 corresponding to the moving images selected for the sections Z1 to Z8.

The specific manner for increasing the uplink throughput is the same as the throughput-increasing process in step S22 of FIG. 20. That is, one or an appropriate combination of switching the postcoding scheme, inputting the lower reception power or reception quality into at least one of the postcoder 25 and reception beamformer 26, assigning dedicated slices, and increasing the number of PUSCH resource blocks is executed.

In step S43, the CPU of the CU 1 selects higher ranked video signals. The selection is executed for the multiple sections in parallel. For the continuous section observation mode, the moving image ranked highest for each of the regions R1 to R8 and for each of sections Z1 to Z8 is selected. For the UEs 30 that capture the moving images, the uplink throughput is increased in step S42.

In step S44, the CPU of the CU 1 executes an overall video signal generation process for the multiple sections in parallel. In the overall video signal generation process, an overall video signal is generated including multiple video signals corresponding to the UEs 30 for which the uplink throughput has been increased. Thus, an overall video signal is generated for each section.

In step S45, the CPU of the CU 1 executes an overall video signal supplying process. In the overall video signal supplying process, the overall video signal generated by the overall video signal generation process is supplied to at least one reproduction device 13 that requests the overall video signal of the continuous section observation mode. The overall video signal supplied by the overall video signal supplying process has a format that enables the reproduction device 13 to simultaneously reproduce multiple moving images corresponding to the multiple video signals included in the overall video signal. The overall video signal also has an instruction indicating each moving image should be displayed in one of the main display portion MS and thumbnail display portions T1 to T9.

Therefore, the display screen of the reproduction device 13 in which the continuous section observation mode is selected displays the game watching screen SC3 illustrated in FIG. 15.

As described above, the CPU of the CU 1 may supply the overall video signals for all the selectable sections Z1 to Z8 to each reproduction device 13, but for the sake of traffic reduction, it is preferable to supply the overall video signal for the section selected by the user of each reproduction device 13. If different sections are selected in different reproduction devices 13, the CPU of the CU 1 supplies the overall video signals for the multiple sections to the destination reproduction devices 13 in step S45 to match the selection in the destination reproduction devices 13.

In step S46, the CPU of the CU 1 determines whether or not the game has ended from the moving image captured by the main camera MC. If the determination in step S46 is affirmative, the operation ends, but if the determination in step S46 is negative, the operation proceeds to step S47.

In step S47, the CPU of the CU 1 determines whether or not a predetermined time has elapsed. If the operation proceeds to step S47 for the first time, the time is counted from the start of the operation. If the operation proceeds to step S47 for the second or subsequent times, the time is counted from the previous step S47. The predetermined time is shorter than the predetermined time in step S27, for example, 1 minute, 2 minutes, or 5 minutes. If the determination in step S47 is affirmative, the operation returns to step S40, and analysis of moving images (step S40) and the moving image ranking process (step S41) are executed again. On the other hand, if the determination in step S47 is negative, the operation proceeds to step S48. The reason why the predetermined time in step 47 is shorter is that it is considered that few UEs 30 continue to capture the same section in soccer games.

In step S48, the CPU of the CU 1 determines whether or not the supply, i.e., uploading of the moving images from one or more of the highest ranked UEs 30 corresponding to the moving image included in the overall video signal (used in the overall video signal generation process) for each of sections Z1 to Z8 has stopped.

If the determination in step S48 is negative, the operation returns to step S43. On the other hand, if the determination in step S48 is affirmative, the operation proceeds to step S49, in which a rank-raising process is executed for the section for which uploading of one or more moving images from the highest ranked UEs 30 has stopped. In the rank-raising process, the rankings of the UEs 30 following the UE 30 that has stopped uploading moving images are raised.

Next, in step S50, the CPU of the CU 1 increases the uplink throughput for the UE 30 newly ranked higher as a result of the rank-raising process. The specific manner for increasing the uplink throughput is the same as the throughput-increasing process in step S42. That is, one or an appropriate combination of switching the postcoding scheme, inputting the lower reception power or reception quality into at least one of the postcoder 25 and reception beamformer 26, assigning dedicated slices, and increasing the number of PUSCH resource blocks is executed.

Next, in step S51, the CPU of the CU 1 reduces the uplink throughput for at least one UE 30 that was in the highest rank, but has stopped uploading the moving image. The specific manner for reducing the uplink throughput is the same as the throughput reduction process in step S22 of FIG. 20. That is, one or an appropriate combination of switching the postcoding scheme, inputting the actual reception power or actual reception quality in the channel state report into at least one of the postcoder 25 and the reception beamformer 26, eliminating the assignment of dedicated slices, and reducing the number of PUSCH resource blocks is executed.

Steps S48-S51 are executed for the UEs 30 capturing each section, for each region in which the UEs 30 are located.

By returning the operation to step S43, the CPU of the CU 1 repeatedly executes the overall video signal generation process (step S44) and the overall video signal supplying process (step S45) based on the moving images continuously uploaded from highly ranked UEs 30. In the embodiment, once the CPU of the CU 1 executes the ranking process (step S41), until a predetermined time elapses from the ranking process (until the determination in step S47 becomes affirmative), the CPU of the CU 1 repeats the overall video signal generation process (step S44) and the overall video signal supplying process (step S45) on the basis of the moving images continuously supplied from the UEs 30 selected by the previous ranking process. Thus, the number of ranking processes is minimized.

On the other hand, if uploading of a moving image ranked higher in the ranking process is stopped, rankings of the UEs in the subsequent ranks are raised (step S49), and the uplink throughput is increased for the newly high ranked UE 30. Therefore, even if uploading of the moving image used for the overall video signal is stopped, there is no need for a new ranking for all the moving images received by the CU 1.

According to the operation shown in FIG. 22, since the overall moving image that includes multiple higher-ranked moving images capturing the section that the viewer wants to focus on is supplied to the reproduction device 13, multiple moving images related to the section that the viewer wants to focus on can be provided simultaneously. In particular, since the uplink throughput is increased for the UEs 30 that upload the highly ranked moving images, the frame rate of the multiple moving images in the overall moving image reproduced on the display device of the reproduction device 13 can be increased, and high-definition moving images can be provided without discomfort.

When the user, i.e., viewer of the reproduction device 13 wants to focus on any of the thumbnail moving images, he/she can click or touch the thumbnail display portion with the pointing device and can watch the main moving image that is the enlarged thumbnail moving image on the main display portion MS.

In the operation of FIG. 22, the ranking process (step S41), the throughput-increasing process (step S42), and the overall video signal generation process (step S44) are executed in parallel for multiple sections, so that the operation is able to provide multiple moving images for multiple sections that may match the various preferences of viewers.

In the ranking process (step S41), moving images with better resolution are ranked higher and moving images with a greater ratio of the area of the desired object in the moving images are ranked higher, so that moving images that conform to viewer's preferences as much as possible can be included in the overall moving image. Furthermore, by ranking moving images from the cameras located in greater heights (elevations) from the field F higher, moving images downwardly viewing the section can be included in the overall moving image. For example, the field of view of cameras 32 of UEs 30 in second-floor seats 2F can easily include the entirety of the section.

In parallel with the operations shown in FIG. 20 and FIG. 22, the CPU of the CU 1 continuously determines, from the movements of the soccer ball and the players in the moving image captured by the main camera MC, whether or not a goal, which is a special occurrence, is predicted by an estimation method described in, for example, JP-A-2019-19459. Specifically, the movements of the ball and field players are applied to an estimation model to determine whether or not a goal is predicted. If a goal is predicted, the CPU of the CU 1 executes the operation in the goal prediction mode shown in FIG. 24.

Figure 24:
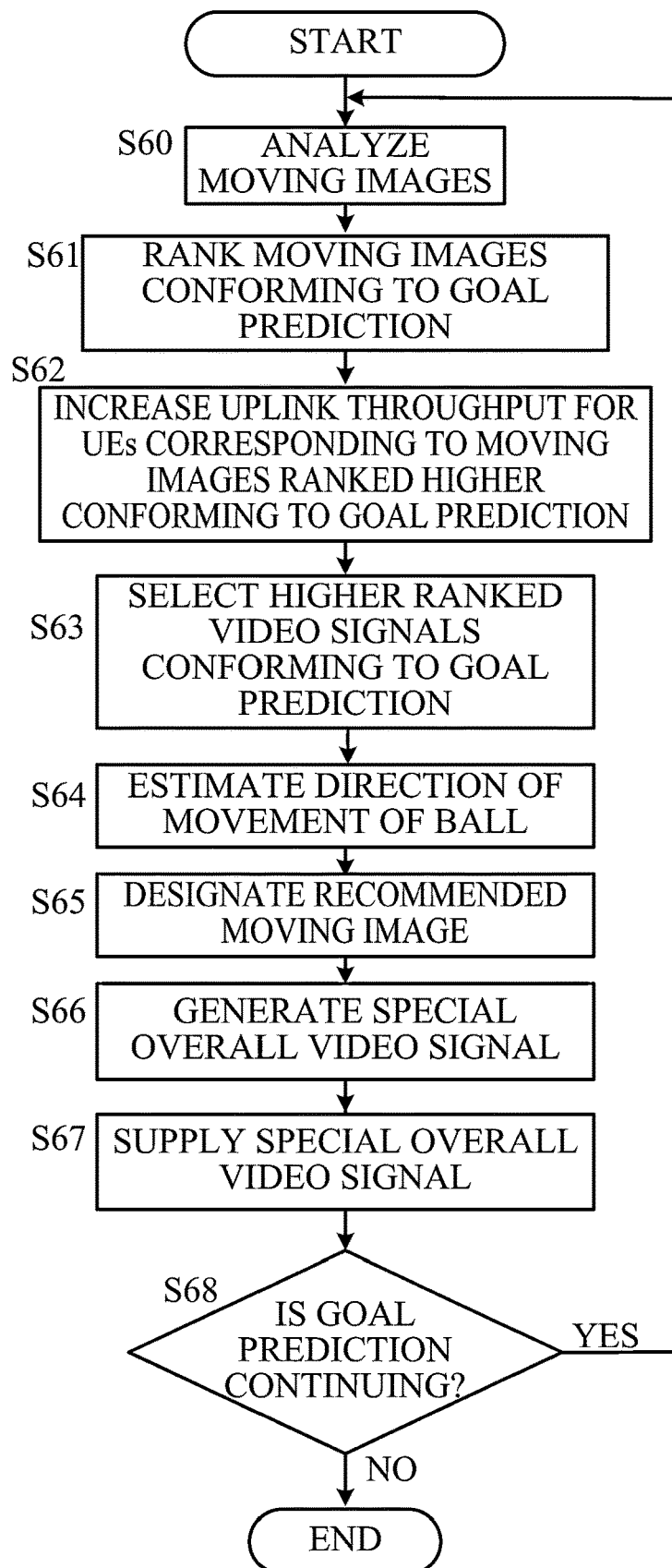
FIG. 24 is a flowchart showing an operation executed by the network management device in the goal prediction mode among the communication control method of the embodiment of the present disclosure.

In FIG. 24, in step S60, the CPU of the CU 1 analyzes moving images uploaded from UEs 30 in the stadium. Here, the CPU of the CU 1 analyzes the resolution of moving images and the ratio of the area of players' whole bodies in moving images capturing a section in which the goal is predicted. For a moving image in which multiple players are captured, the ratio of the area of the whole bodies of the multiple players in the moving image is analyzed.

In step S61, the CPU of the CU 1 executes a ranking process for the moving images that conforms to the goal prediction. In this ranking process, moving images with better resolution are ranked higher and moving images with a greater ratio of the area of the whole bodies of one or more players in the moving images are ranked higher. For example, each moving image may be given a first weighting that is greater as the resolution is better and a second weighting that is greater as the ratio of the area of the player's whole body in the moving image is greater, and the sum or product of the first and second weightings may be calculated. A higher ranking may then be given to the moving image for which the sum or product of the weightings is greater. However, for multiple moving images capturing the same player, a further lower ranking may be given to a lower ranked moving image capturing the player in order to provide other moving image of other players to the reproduction device 13.

In the ranking process, in addition to considering the resolution and the ratio of the area of the desired object in the moving images, moving images taken by cameras 32 of UEs 30 that are closer to the player may be ranked higher. For example, each moving image may be given a third weighting that is greater as the distance from the camera 32 to the player is shorter, and the sum or product of the first, second, and third weightings may be calculated. The moving image with a greater sum or product of the weightings may then be given a higher ranking. Furthermore, the upload speed of the moving images from the UEs 30 may be taken into account in the ranking process.

The CPU of the CU 1 stores the ranking results in the RAM or HDD of the CU 1. The IDs of the UEs 30 that capture highly ranked moving images are stored along with their rankings. The number of UEs 30 to be stored is equal to or greater than the number of the initial thumbnail moving images desired. The stored UEs 30 can be regarded as capturing higher-ranked moving images that conform to the goal prediction.

In step S62, the CPU of the CU 1 executes a special throughput-increasing process. In the special throughput-increasing process, the uplink throughput is increased for the UEs 30, stored in the RAM or HDD, that correspond to the moving images ranked higher in step S61. The specific manner for increasing the uplink throughput is the same as that described above with respect to step S22 in FIG. 20. Thus, the uplink throughput can be increased for the UEs 30.

In step S63, the CPU of the CU 1 selects higher ranked video signals that conforms to the goal prediction.

Steps S64 and S65 are executed to add the recommended mark RM to the game watching screen SC4 in the goal prediction mode. In step S64, the CPU of the CU 1 estimates at least one candidate direction of movement of the soccer ball, which is the object of interest in the special occurrence. In step S65, the CPU of the CU 1 designates at least one moving image of the section corresponding to the estimated candidate direction of movement of the soccer ball as a recommended moving image. In a special overall video signal generation process (step S66) that will be described, the CPU of the CU 1 marks the moving image as the recommended moving image in a special overall video signal. Thus, as shown in FIGS. 17 and 18, on the game watching screen SC4 in the goal prediction mode, the recommended mark RM is assigned to at least one moving image (recommended moving image) that shows the section corresponding to the candidate direction of movement of the soccer ball B that has been estimated. This allows the viewer, i.e., the user of the reproduction device 13 to be advised of the moving image to pay attention to.

However, steps S64 and S65 are not absolutely necessary.

In step S66, the CPU of the CU 1 executes a special overall video signal generation process. In the special overall video signal generation process, a special overall video signal (i.e., special overall moving image signal) including multiple video signals (i.e., multiple moving image signals) corresponding to the selected UEs 30 for which uplink throughput was increased in the special throughput-increasing process (step S62) is generated.

In step S67, the CPU of the CU 1 executes a special overall video signal supplying process. In the special overall video signal supplying process, the special overall video signal is supplied to the reproduction device 13 that requests the special overall video signal, i.e., the reproduction device 13 in which the goal prediction mode is selected (see FIG. 8). The special overall video signal supplied by the special overall video signal supplying process has a format that enables the reproduction device 13 to simultaneously reproduce multiple moving pictures corresponding to the multiple video signals included in the special overall video signal. The special overall video signal also has an instruction indicating each moving image should be displayed in one of the main display portion MS and thumbnail display portions T1 to T9.

Therefore, on the display screen of the reproduction device 13 in which the goal prediction mode is selected, the game watching screen SC4 illustrated in FIG. 17 is displayed.

In step S68, the CPU of the CU 1 determines whether or not the goal prediction is continuing. If the determination in step S68 is negative, the operation ends, but if the determination in step S68 is affirmative, the operation returns to step S60. By returning the operation to step S60, the CPU of the CU 1 generates and supplies a special overall moving image conforming to the goal prediction mode. Thus, the operation in FIG. 24 continues as long as a goal is predicted. Therefore, a user who has selected the goal prediction mode can enjoy the game watching screen SC4 corresponding to the goal prediction mode.

As described above, when a special occurrence is predicted in an event, an overall moving image including multiple preferred moving images related to the special occurrence can be provided. Since the uplink throughput is increased for the UEs 30 that upload the highly ranked moving images, the frame rate of the multiple moving images in the special overall moving image reproduced on the display device of the reproduction device 13 can be increased, and high-definition moving images can be provided without discomfort.

The operation in the goal prediction mode shown in FIG. 24 is executed in parallel with the operations shown in FIGS. 20 and 22. Therefore, as long as a goal is predicted, the CPU of the CU 1 executes the special throughput-increasing process, the special overall video signal generation process, and the special overall video signal supplying process in FIG. 24 in parallel with the throughput-increasing process, the overall video signal generation process, and overall video signal supplying process in FIGS. 20 and 22. Thus, UEs 30 in which the goal prediction mode is selected can receive the special overall video signal related to goal prediction, and UEs 30 in which the goal prediction mode is not selected can receive the overall video signal for the mode selected by UE 30.

The present disclosure has been shown and described with reference to preferred embodiments thereof. However, it will be understood by those skilled in the art that various changes in form and detail may be made without departing from the scope of the disclosure as defined by the claims. Such variations, alterations, and modifications are intended to be encompassed in the scope of the present disclosure.

For example, ZF postcoding, MMSE postcoding, and MLD postcoding are exemplified as postcoding schemes for uplink beamforming. ZF postcoding and MMSE postcoding are exemplified as normal postcoding schemes (postcoding schemes executed after the second postcoding adjustment process), whereas MLD postcoding is exemplified as a postcoding scheme that provides high reception quality (postcoding scheme executed after the first postcoding adjustment process).

However, other postcoding schemes may be used. In this case, the postcoding scheme that results in higher reception quality at the RU is executed as a result of the first postcoding adjustment process, and the postcoding scheme that results in lower reception quality at the RU is executed as a result of the second postcoding adjustment process.

A soccer stadium is exemplified as an event venue in which embodiments of the present disclosure are implemented. However, the present disclosure may be applied to baseball stadiums, track and field stadiums, parks, gymnasiums, theaters, and other facilities. Events are not limited to soccer games, but may also be other sports competitions, theatrical plays, or concerts.

In the goal prediction mode of the embodiment, the object of interest used as a criterion for selecting the recommended moving image is the soccer ball. However, the object of interest in a special occurrence varies depending on the type of event.

The above embodiments and variations may be combined as long as they are not contradictory.

The goal prediction mode does not have to be selected by the user of the reproduction device 13 on the mode selection screen SS (FIG. 8). In other words, a mark may be displayed on the UEs 30 that receive the overall moving image in the ball tracking mode, the player-whole-body tracking mode, the player-face tracking mode, or the continuous section observation mode to notify the users of the UEs 30 when a goal is predicted. Accordingly, the users of the UEs 30 can select the goal prediction mode when they notice the mark.

In the above embodiments, when a moving image other than the main moving image captured by the main camera MC is selected by the user of the reproduction device 13, the main moving image is displayed in the central thumbnail display portion T9 among the thumbnail display portions T1 to T9 (see FIGS. 12, 14, 16, and 18). However, the main moving image may be displayed at other locations on the game watching screen, for example, in a smaller size within the main display portion MS. If the main moving image is displayed in a smaller size within the main display portion MS, the main moving image should be movable by user manipulation with a pointing device. In any case, the main moving image is enlarged and displayed in the main display portion MS again when the user clicks or touches the main moving image.

Aspects of the present disclosure are also set out in the following numbered clauses:

Clause 1. A network management device comprising a processor configured to execute:
  a ranking process for ranking multiple moving images taken by cameras of wireless communication terminals simultaneously capturing one of multiple sections in an event venue to select multiple moving images ranked higher for the section;
  a throughput-increasing process for increasing uplink throughput for the multiple wireless communication terminals corresponding to the multiple moving images ranked higher for the section selected in the ranking process;
  an overall video signal generation process for generating an overall video signal including multiple video signals corresponding to the multiple wireless communication terminals for which the uplink throughput is increased in the throughput-increasing process; and
  an overall video signal supplying process for supplying the overall video signal generated in the overall video signal generation process to at least one reproduction device in which moving images are reproduced, the overall video signal being in a format that enables the reproduction device to simultaneously reproduce the multiple moving images corresponding to the multiple video signals in the overall video signal.

Clause 2. The network management device according to Clause 1, wherein the processor is configured to rank moving images taken by cameras of wireless communication terminals located in multiple regions in the event venue capturing the section in the ranking process to produce a ranking result in each of the multiple regions; and
  to increase uplink throughput for the wireless communication terminal corresponding to at least the moving image ranked highest in each of the multiple regions in the throughput-increasing process.

Clause 3. The network management device according to Clause 1 or 2, wherein the processor is configured to rank moving images on the basis of at least resolution of each moving image and a ratio of an area of the section in each moving image, so that moving images with better resolution are ranked higher and moving images with a greater ratio of the area of the section in the moving images are ranked higher in the ranking process.

Clause 4. The network management device according to Clause 3, wherein the processor is configured to rank moving images taken by the cameras located in greater elevations higher in the ranking process.

Clause 5. The network management device according to any one of Clauses 1 to 4, wherein the processor is configured to repeat the overall video signal generation process and the overall video signal supplying process on the basis of the moving images continuously supplied from the wireless communication terminals selected by a previous ranking process once the processor executes the ranking process.

Clause 6. The network management device according to Clause 5, wherein the processor is configured to store identifiers of the wireless communication terminals that capture the moving images selected in the ranking process along with rankings of the moving images;
  to execute a rank-raising process when a moving image used in the overall video signal generation process is no longer supplied from a wireless communication terminal, the rank-raising process raising rankings of wireless communication terminals following the wireless communication terminal that has stopped supplying the moving image; and
  to increase uplink throughput for a wireless communication terminal that is newly ranked higher in the rank-raising process.

Clause 7. The network management device according to any one of Clauses 1 to 6, wherein the processor is configured to execute the ranking process, the throughput-increasing process, and the overall video signal generation process in parallel for multiple sections in the event venue.

Clause 8. The network management device according to any one of Clauses 1 to 7, wherein the processor is configured to execute:
  a special throughput-increasing process for increasing uplink throughput for multiple wireless communication terminals corresponding to multiple moving images related to a special occurrence when the special occurrence is predicted in an event in the event venue;
  a special overall video signal generation process for generating a special overall video signal including multiple video signals corresponding to the multiple wireless communication terminals for which the uplink throughput is increased in the special throughput-increasing process; and
  a special overall video signal supplying process for supplying the special overall video signal generated in the special overall video signal generation process to the reproduction device, the special overall video signal being in a format that enables the reproduction device to simultaneously reproduce the multiple moving images corresponding to the multiple video signals in the special overall video signal.

Clause 9. The network management device according to Clause 8, wherein the processor is configured to estimate at least one candidate direction of movement of an object of interest in the special occurrence; and mark at least one moving image capturing a section in the event venue corresponding to the candidate direction of movement as a recommended moving image within the special overall video signal in the special overall video signal generation process.

Clause 10. The network management device according to Clause 8 or 9, wherein the processor is configured to execute the special throughput-increasing process, the special overall video signal generation process, and the special overall video signal supplying process in parallel with the overall video signal generation process and the overall video signal supplying process as long as the special occurrence is predicted in the event.

Clause 11. A communication control method comprising:

ranking multiple moving images taken by cameras of wireless communication terminals simultaneously capturing one of multiple sections in an event venue to select multiple moving images ranked higher for the section;

increasing uplink throughput for the multiple wireless communication terminals corresponding to the multiple moving images ranked higher for the section;

generating an overall video signal including multiple video signals corresponding to the multiple wireless communication terminals for which the uplink throughput is increased;

supplying the overall video signal to at least one reproduction device in which moving images are reproduced, the overall video signal being in a format that enables the reproduction device to simultaneously reproduce the multiple moving images corresponding to the multiple video signals in the overall video signal.

What is claimed is:

1. A network management device comprising a processor configured to execute:

a ranking process for ranking multiple moving images taken by cameras of wireless communication terminals simultaneously capturing one of multiple sections in an event venue to select multiple moving images ranked higher for the section;

a throughput-increasing process for increasing uplink throughput for the multiple wireless communication terminals corresponding to the multiple moving images ranked higher for the section selected in the ranking process;

an overall video signal generation process for generating an overall video signal including multiple video signals corresponding to the multiple wireless communication terminals for which the uplink throughput is increased in the throughput-increasing process; and an overall video signal supplying process for supplying the overall video signal generated in the overall video signal generation process to at least one reproduction device in which moving images are reproduced, the overall video signal being in a format that enables the reproduction device to simultaneously reproduce the multiple moving images corresponding to the multiple video signals in the overall video signal.

2. The network management device according to claim 1, wherein the processor is configured to rank moving images taken by cameras of wireless communication terminals located in multiple regions in the event venue capturing the section in the ranking process to produce a ranking result in each of the multiple regions; and to increase uplink throughput for the wireless communication terminal corresponding to at least the moving image ranked highest in each of the multiple regions in the throughput-increasing process.

3. The network management device according to claim 1, wherein the processor is configured to rank moving images on the basis of at least resolution of each moving image and a ratio of an area of the section in each moving image, so that moving images with better resolution are ranked higher and moving images with a greater ratio of the area of the section in the moving images are ranked higher in the ranking process.

4. The network management device according to claim 3, wherein the processor is configured to rank moving images taken by the cameras located in greater elevations higher in the ranking process.

5. The network management device according to claim 1, wherein the processor is configured to repeat the overall video signal generation process and the overall video signal supplying process on the basis of the moving images continuously supplied from the wireless communication terminals selected by a previous ranking process once the processor executes the ranking process.

6. The network management device according to claim 5, wherein the processor is configured to store identifiers of the wireless communication terminals that capture the moving images selected in the ranking process along with rankings of the moving images;

to execute a rank-raising process when a moving image used in the overall video signal generation process is no longer supplied from a wireless communication terminal, the rank-raising process raising rankings of wireless communication terminals following the wireless communication terminal that has stopped supplying the moving image; and to increase uplink throughput for a wireless communication terminal that is newly ranked higher in the rank-raising process.

7. The network management device according to claim 1, wherein the processor is configured to execute the ranking process, the throughput-increasing process, and the overall video signal generation process in parallel for multiple sections in the event venue.

8. The network management device according to claim 1, wherein the processor is configured to execute:

a special throughput-increasing process for increasing uplink throughput for multiple wireless communication terminals corresponding to multiple moving images related to a special occurrence when the special occurrence is predicted in an event in the event venue;

a special overall video signal generation process for generating a special overall video signal including multiple video signals corresponding to the multiple wireless communication terminals for which the uplink throughput is increased in the special throughput-increasing process; and a special overall video signal supplying process for supplying the special overall video signal generated in the special overall video signal generation process to the reproduction device, the special overall video signal being in a format that enables the reproduction device to simultaneously reproduce the multiple moving images corresponding to the multiple video signals in the special overall video signal.

9. The network management device according to claim 8, wherein the processor is configured to estimate at least one candidate direction of movement of an object of interest in the special occurrence; and
    mark at least one moving image capturing a section in the event venue corresponding to the candidate direction of movement as a recommended moving image within the special overall video signal in the special overall video signal generation process.

10. The network management device according to claim 8, wherein the processor is configured to execute the special throughput-increasing process, the special overall video signal generation process, and the special overall video signal supplying process in parallel with the overall video signal generation process and the overall video signal supplying process as long as the special occurrence is predicted in the event.

11. A communication control method comprising:
ranking multiple moving images taken by cameras of wireless communication terminals simultaneously capturing one of multiple sections in an event venue to select multiple moving images ranked higher for the section;
increasing uplink throughput for the multiple wireless communication terminals corresponding to the multiple moving images ranked higher for the section;
generating an overall video signal including multiple video signals corresponding to the multiple wireless communication terminals for which the uplink throughput is increased;
supplying the overall video signal to at least one reproduction device in which moving images are reproduced, the overall video signal being in a format that enables the reproduction device to simultaneously reproduce the multiple moving images corresponding to the multiple video signals in the overall video signal.

* * * * *